(12) United States Patent  
Yazawa et al.

(10) Patent No.: US 7,248,437 B2
(45) Date of Patent: Jul. 24, 2007

(54) PERPENDICULAR MAGNETIC RECORDING HEAD AND METHOD FOR MANUFACTURING THE SAME

(75) Inventors: Hisayuki Yazawa, Niigata-ken (JP); Kiyoshi Kobayashi, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 355 days.

(21) Appl. No.: 10/912,946

(22) Filed: Aug. 6, 2004

(65) Prior Publication Data

US 2005/0041337 A1    Feb. 24, 2005

(30) Foreign Application Priority Data

Aug. 21, 2003 (JP) .............. 2003-296976

(51) Int. Cl.
- G11B 5/147 (2006.01)
- G11B 5/11 (2006.01)
- B11B 5/187 (2006.01)

(52) U.S. Cl. .............. 360/126; 360/125; 360/128
(58) Field of Classification Search .............. 360/126, 360/125, 128
See application file for complete search history.

(56) References Cited

U.S. PATENT DOCUMENTS

| | | | | |
|---|---|---|---|---|
| 4,404,609 A | * | 9/1983 | Jones, Jr. ................... | 360/126 |
| 4,589,042 A | * | 5/1986 | Anderson et al. ........... | 360/125 |
| 4,703,382 A | * | 10/1987 | Schewe et al. ............. | 360/125 |
| 4,752,850 A | * | 6/1988 | Yamada et al. ............. | 360/121 |
| 4,951,166 A | * | 8/1990 | Schewe ...................... | 360/119 |
| 4,974,110 A | * | 11/1990 | Kanamine et al. .......... | 360/126 |
| 5,109,311 A | * | 4/1992 | Hanazono et al. .......... | 360/119 |
| 5,479,310 A | * | 12/1995 | Atsushi et al. ............. | 360/126 |
| 5,978,186 A | * | 11/1999 | Murata et al. ............... | 360/123 |
| 6,156,375 A | * | 12/2000 | Hu et al. .................... | 427/116 |
| 6,301,075 B1 | * | 10/2001 | Sato ........................... | 360/126 |
| 7,106,554 B2 | * | 9/2006 | Guan et al. ................. | 360/125 |
| 2002/0131204 A1 | * | 9/2002 | Mochizuki et al. ......... | 360/126 |
| 2005/0219747 A1 | * | 10/2005 | Hsu et al. .................... | 360/126 |

FOREIGN PATENT DOCUMENTS

| | | |
|---|---|---|
| JP | 2002-92820 | 3/2002 |
| JP | 2002-133610 | 5/2002 |

* cited by examiner

*Primary Examiner*—Wayne Young
*Assistant Examiner*—Matthew G. Kayrish
(74) *Attorney, Agent, or Firm*—Brinks Hofer Gilson & Lione

(57) ABSTRACT

In a non-magnetic material layer, a concave portion is formed above a groove G. In addition, an auxiliary magnetic pole layer is formed having a convex portion which extends in the direction toward a main magnetic pole layer and which is placed in the concave portion. Accordingly, since a magnetic flux B passing in a perpendicular magnetic recording head from the main magnetic pole layer to the auxiliary magnetic pole layer is generated, an appropriate adjustment of the intensity of a magnetic field A generated from the main magnetic pole layer can be easily performed, and the edge of a recording track on a recording medium M can be clearly defined.

14 Claims, 15 Drawing Sheets

PERPENDICULAR MAGNETIC RECORDING HEAD AND METHOD FOR MANUFACTURING THE SAME

This application claims the benefit of priority to Japanese Patent Application No. 2003-396976, herein incorporated by reference.

BACKGROUND OF THE INVENTION

1. Field of the Invention

The present invention relates to perpendicular magnetic recording heads for performing recording by applying a magnetic field perpendicularly to a surface of a recording medium such as a disc, and more particularly, relates to a perpendicular magnetic recording head capable of recording magnetic data on a recording medium with narrow track pitches and a method for manufacturing the same.

2. Description of the Related Art

A magnetic head shown in FIG. 13 is a recording magnetic head used for a perpendicular magnetic recording device. The perpendicular magnetic recording device in which a recording medium is magnetized in a direction perpendicular to the surface thereof is able to record magnetic data at a high density as compare to a device in which a recording medium is magnetized in a direction parallel to the surface thereof.

FIG. 13 is a cross-sectional view of the structure of a magnetic head used for a perpendicular magnetic recording device, and FIG. 14 is a front view of the magnetic head shown in FIG. 13. FIG. 13 is a cross-sectional view of the magnetic head taken on the chain line XIII-XIII shown in FIG. 14, the head being viewed along the direction indicated by the arrows.

A magnetic head H is provided at an end surface of a slider at a trailing side, the slider moving above a recording medium while floating or sliding thereon.

The magnetic head H has a main magnetic pole layer 1 and a return path layer (auxiliary magnetic pole layer) 2 provided thereabove. The main magnetic pole layer 1 and the return path layer 2 are formed of a ferromagnetic material.

An end surface 1a of the main magnetic pole layer 1 and an end surface 2a of the return path layer 2 are disposed with a predetermined distance provided therebetween. In addition, the return path layer 2 and the main magnetic pole layer 1 are magnetically coupled to each other at a magnetic coupling portion 1b.

Between the return path layer 2 and the main magnetic pole layer 1, a non-magnetic insulating layer 3 is provided which is made of an inorganic material such as $Al_2O_3$ or $SiO_2$, and inside the non-magnetic insulating layer 3, a coil layer 4 made of a conductive material such as Cu is formed.

The area of the end surface 1a of the main magnetic pole layer 1 is considerably small as compared to that of the end surface 2a of the return path layer 2.

Accordingly, a magnetic flux $\phi$ is concentrated on the end surface 1a of the main magnetic pole layer 1, and in a portion of a hard film Ma of a recording medium M, which faces the end surface 1a, a magnetic datum is recorded by the magnetic flux $\phi$. The recording medium M is, for example, a disc-shaped medium and is formed of the hard film Ma which is provided at the magnetic head side and has a high residual magnetization and a soft film Mb which is provided behind the hard film Ma and has a high magnetic permeability. The magnetic flux $\phi$ generated from the main magnetic pole layer 1 enters the return path layer 2 through the soft film Mb.

The return path 2 of a perpendicular magnetic recording head, shown in FIGS. 13 and 14, is formed to have a convex portion 2b protruding toward the main magnetic pole layer 1 side. When this convex portion 2b is provided, the spread of a magnetic flux passing from the main magnetic pole layer 1 to the return path layer 2 through the recording medium M can be suppressed, and hence the edge of a recording track on the recording medium M can be clearly defined, and a higher recording density can be achieved by narrowing a track. A perpendicular magnetic recording head as described above has been disclosed in Japanese Unexamined Patent Application Publication No. 2002-92820.

In addition, in Japanese Unexamined Patent Application Publication No. 2002-133610, a perpendicular magnetic recording head as shown in FIG. 15 has been disclosed in which a facing surface 10a of a main magnetic pole layer 10 has a taper portion 10c.

When the perpendicular magnetic recording head is moved between an outer periphery and an inner periphery of the disc-shaped recording medium M, the main magnetic pole layer 10 is inclined with respect to the tangential direction (A direction in the figure) of rotation of the recording medium M to produce a skew angle (yaw angle).

In the perpendicular magnetic recording head having the main magnetic pole layer 10 provided with the taper portion 10C, as shown in FIG. 15, the intensity of a magnetic field generated from the main magnetic pole layer 10 is high, and in addition, magnetic flux in the tangential direction (A direction in the figure) of the recording medium M converges; hence, when the skew angle is generated, the spread of the recording track width can be reduced.

The perpendicular magnetic recording head shown in FIGS. 13 to 15 is formed to enhance the magnetic field passing from the main magnetic pole layer to the return path layer 2 through the recording medium M.

However, when the intensity of the magnetic field is simply enhanced as described above, the spread of the magnetic flux passing from the main magnetic pole layer to the return path layer 2 through the recording medium M cannot be effectively reduced. In particular, when the intensity of the magnetic field is simply enhanced, the magnetic field generated from the main magnetic pole layer is spread in the track width direction (X direction in the figure), and a problem may arise in that a substantial recording track width is liable to increase.

SUMMARY OF THE INVENTION

Accordingly, the present invention was made to solve the problem described above, and an object of the present invention is to provide a perpendicular magnetic recording head and a method for manufacturing the same, in the perpendicular magnetic recording head of the present invention, a magnetic field generated therefrom can be effectively converged and a substantial recording track width can be easily controlled in a predetermined range.

The present invention provides a perpendicular magnetic recording head which comprises: an auxiliary magnetic pole layer; a main magnetic pole layer facing thereto provided at a side of a facing surface facing a recording medium, the main magnetic pole layer being composed of a front portion having a small thickness provided at the facing surface side and a rear portion having a large thickness provided at a rear side apart from the facing surface in a height direction; a first non-magnetic layer having inner side surfaces which are provided at two side parts of the main magnetic pole layer; a non-magnetic material layer which is provided on the first non-magnetic layer and the main magnetic pole layer and which is present between the auxiliary magnetic pole layer and the main magnetic pole layer; a coil layer provided at the rear side in the height direction for applying a recording magnetic field to the auxiliary magnetic pole layer and the main magnetic pole layer. In the perpendicular magnetic recording head described above, data is recorded on the recording medium by a perpendicular magnetic field generated from the main magnetic pole layer, the inner side surfaces of the first non-magnetic layer and a top surface of the front portion of the main magnetic pole layer form a groove, the non-magnetic material has a concave portion, and the auxiliary magnetic pole layer has a convex portion at the facing surface side, the convex portion extending in the direction to the main magnetic pole layer and being placed in the concave portion.

In the present invention, since the front portion having a small thickness of the main magnetic pole layer is formed at the facing surface side, even when the main magnetic pole layer is inclined with respect to the tangential direction of rotation of the recording medium to produce a skew angle (yaw angle), the spread of the track width can be suppressed. In addition, since the main magnetic pole layer is formed to have the rear portion having a large thickness at the rear side in the height direction, the intensity of the magnetic field generated from the main magnetic pole layer can be maintained at a high level.

In addition, since the auxiliary magnetic pole layer is formed to have the convex portion extending in the direction toward the main magnetic pole layer, the spread of the magnetic flux passing from the main magnetic pole layer to the auxiliary magnetic pole layer can be suppressed.

Furthermore, since the convex portion is placed in the concave portion formed in the non-magnetic material layer, a magnetic flux is generated which passes in the perpendicular magnetic recording head from the main magnetic pole layer to the auxiliary magnetic pole layer. Accordingly, compared to a related perpendicular magnetic recording head in which the intensity of the magnetic field generated from the main magnetic pole layer is simply enhanced, an appropriate adjustment of the intensity of the magnetic field described above can be easily performed.

Hence, according to the perpendicular magnetic recording head of the present invention, since the magnetic field generated therefrom can be effectively converged, and the edge of the recording track on the recording medium can be clearly defined, the substantial recording track width can be controlled within a predetermined range, and as a result, a higher recording density can be achieved by narrowing the track.

In addition, a bottom surface of the convex portion of the auxiliary magnetic pole layer is preferably located at a position lower than that of a top surface of the rear portion of the main magnetic pole layer. The reason for this is that an appropriate adjustment of the intensity of the magnetic flux passing in the perpendicular magnetic recording head from the main magnetic pole layer to the auxiliary magnetic pole layer can be easily performed.

The perpendicular magnetic recording head of the present invention may further comprise a second non-magnetic layer between the main magnetic pole layer and the first non-magnetic layer. In addition, a top surface of the second non-magnetic layer is preferably located at a position lower than that of a top surface of the first non-magnetic layer.

In particular, in the case in which the first non-magnetic layer and the second non-magnetic layer are etched under the same condition, when an etching rate of the second non-magnetic layer is higher than an etching rate of the first non-magnetic layer, the main magnetic pole layer can be appropriately planarized.

In addition, when the first non-magnetic layer, the second non-magnetic layer, and the main magnetic pole layer are etched under the same condition, etching rates of the second non-magnetic layer and the main magnetic pole layer are preferably higher than the etching rate of the first non-magnetic layer.

The first non-magnetic layer is formed, for example, of alumina ($Al_2O_3$), and the second non-magnetic layer may be formed of at least one of Ti, W, Cr, Ta, Mo, Au, Pd, Pt, NiCr, NiCu, Al—Si—O, a silicon oxide, a Ti oxide, a W oxide, a Cr oxide, and a Ta oxide.

Alternatively, the first non-magnetic layer is formed, for example, of at least one of $SiO_2$ and Al—Si—O, and the second non-magnetic layer may be formed of at least one of W, $WO_3$, Cr, CrOX, and Mo.

A method for manufacturing a perpendicular magnetic recording head, according to the present invention, comprises the following steps of:

(a) forming a main magnetic pole layer using a magnetic material;

(b) forming a first non-magnetic layer at two side parts and a top part of the main magnetic pole layer;

(c) polishing the first non-magnetic layer to form a planarized surface;

(d) milling a front portion of the main magnetic pole layer and a front portion of the first non-magnetic layer by dry etching so as to make the thickness of the front portion of the main magnetic pole layer smaller than that of a rear portion thereof and so as to form a groove from inner side surfaces of the first non-magnetic layer and a top surface of the front portion of the main magnetic pole layer;

(e) forming a non-magnetic material layer on the first non-magnetic layer and the main magnetic pole layer so as to have a concave portion above the groove; and (f) forming an auxiliary magnetic pole layer on the non-magnetic material layer so as to have a convex portion which extends in the direction toward the main magnetic pole layer and which is placed in the concave portion.

The main magnetic pole layer formed of a magnetic material and the first non-magnetic layer formed of an insulating material have different etching rates from each other, and the etching rate of the main magnetic pole layer by dry etching is higher than that of the first non-magnetic layer.

Accordingly, in said step (d), when the front portion of the main magnetic pole layer and the front portion of the first non-magnetic layer are milled by dry etching, the inner side surfaces of the first non-magnetic layer and the top surface of the front portion of the main magnetic pole layer can form a groove.

Subsequently, since the auxiliary magnetic pole layer is formed above the groove with the non-magnetic material layer provided therebetween, the convex portion of the auxiliary magnetic pole layer can be easily formed in the concave portion, the convex portion extending in the direction toward the main magnetic pole layer.

In the present invention, in said step (e), the non-magnetic material layer is preferably formed so that a top surface of the concave portion thereof is located at a position lower than that of a top surface of the rear portion of the main magnetic pole layer, and in said step (f), the auxiliary magnetic pole layer is preferably formed so that a bottom surface of the convex portion thereof is located at a position lower than that of the top surface of the rear portion of the main magnetic pole layer.

When the bottom surface of the convex portion of the auxiliary magnetic pole layer is located at a position lower than that of the top surface of the rear portion of the main magnetic pole layer, an appropriate adjustment of the intensity of a magnetic flux passing in the perpendicular magnetic recording head from the main magnetic pole layer to the auxiliary magnetic pole layer can be easily performed.

In addition, the method for manufacturing a perpendicular magnetic recording head, according to the present invention, may further comprise the step of, between said steps (a) and (b): (g) forming a second non-magnetic layer on the two side parts and the top part of the main magnetic pole layer. In the method described above, in said step (b), the first non-magnetic layer is preferably provided at two side parts and a top part of the second non-magnetic layer, and in said step (d), the front portion of the main magnetic pole layer, a front portion of the second non-magnetic layer, and the front portion of the first non-magnetic layer are milled by dry etching so that the top surface of the second non-magnetic layer is located at a position lower than that of the top surface of the first non-magnetic layer.

In the case in which the second non-magnetic layer is provided at the two side parts of the main magnetic pole layer as is the present invention, when the main magnetic pole layer, the second non-magnetic layer, and the first non-magnetic layer are milled by dry etching in said step (d), deep excavation of the main magnetic pole layer and the planarization thereof can be easily performed, and as a result, reliable formation of the groove made of the inner side surfaces of the first non-magnetic layer and the top surface of the front portion of the main magnetic pole layer can be easily performed.

In the manufacturing method of the present invention, when the first non-magnetic layer and the second non-magnetic layer are etched under the same condition, an etching rate of the second non-magnetic layer is preferably higher than an etching rate of the first non-magnetic layer.

According to the present invention, since the second non-magnetic layer is rapidly milled as compared to the first non-magnetic layer, the formation of the groove is facilitated by the second non-magnetic layer in said step (e).

In addition, when the first non-magnetic layer, the second non-magnetic layer, and the main magnetic pole layer are etched under the same condition, etching rates of the second non-magnetic layer and the main magnetic pole layer are preferably higher than an etching rate of the first non-magnetic layer.

The first non-magnetic layer is formed, for example, of alumina ($Al_2O_3$), and the second non-magnetic layer may be formed of at least one of Ti, W, Cr, Ta, Mo, Au, Pd, Pt, NiCr, NiCu, Al—Si—O, a silicon oxide, a Ti oxide, a W oxide, a Cr oxide, and a Ta oxide.

Alternatively, the first non-magnetic layer is formed, for example, of at least one of $SiO_2$ and Al—Si—O, and the second non-magnetic layer may be formed of at least one of W, $WO_3$, Cr, CrOX, and Mo.

DESCRIPTION OF THE PREFERRED EMBODIMENTS

Figure 1:
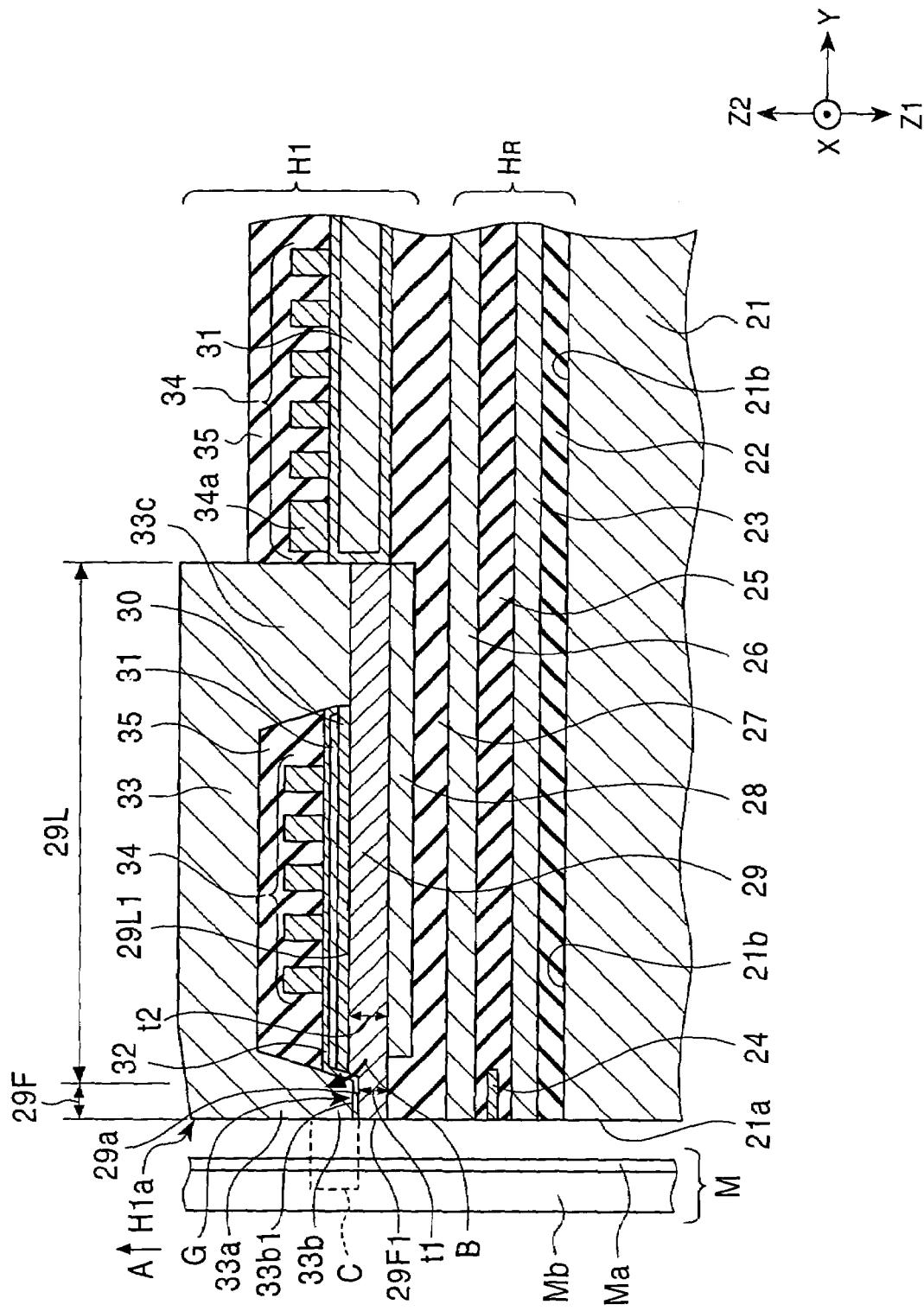
FIG. 1 is a cross-sectional view of a perpendicular magnetic recording head facing to a recording medium, according to a first embodiment of the present invention.

FIG. 1 is a cross-sectional view showing a perpendicular magnetic recording head of a first embodiment of the present invention. A perpendicular magnetic recording head H1 shown in FIG. 1 is a magnetic head which applies a perpendicular magnetic field to a recording medium M to magnetize a hard film Ma thereof in a direction perpendicular thereto.

The recording medium M generally has a disc shape and is composed of a hard film Ma which has a high residual magnetization and is provided at a side facing the magnetic head, and a soft film Mb which has a high magnetic permeability and is provided behind the hard film Ma. The disc is rotated around the center thereof.

A slider 21 is formed of a non-magnetic material such as $Al_2O_3$.TiC, and a facing surface 21a of the slider 21 faces the recording medium M. When the recording medium M is rotated, by an airflow along the surface thereof, the slider 21 is allowed to float from a surface of the recording medium M, or the slider 21 is allowed to slide thereon. In FIG. 1, the moving direction of the recording medium M with respect to the slider 21 is an A direction.

At an end surface 21b of the slider 21 at a trailing side, a non-magnetic insulating layer 22 is formed using an inorganic material such as $Al_2O_3$ or $SiO_2$, and on this non-magnetic insulating layer 22, a reading portion HR is formed.

The reading portion HR has a lower shield layer 23, an upper shield layer 26, and a reading element 24 provided inside an inorganic insulating layer (gap insulating layer) 25 which is located between the lower shield layer 23 and the upper shield layer 26. The reading element 24 is an element using a magnetoresistive effect, such as an anisotropic magnetoresistive (AMR), a giant magnetoresistive (GMR), or a tunnel type magnetoresistive (TMR) effect.

On the reading portion HR, an isolation layer 27 is formed using an inorganic material such as $Al_2O_3$ or $SiO_2$, and on the isolation layer 27, the recording magnetic head H1 is provided. A facing surface H1a of the magnetic head H1 facing a recording medium is approximately flush with the facing surface 21a of the slider 21.

In this embodiment, without providing the reading portion HR, the magnetic head H1 for perpendicular magnetic recording may only be provided on the end surface 21b of the slider 21 at the trailing side.

In the magnetic head H1, a yoke layer 28 is formed by plating using a ferromagnetic material such as Permalloy (Ni—Fe). The yoke layer 28 is buried in the isolation layer 27 and is not exposed at the facing surface H1a facing a recording medium.

On a top surface of the yoke layer 28, a plating underlying film is formed by sputtering using a conductive metal such as NiFe.

In the embodiment shown in FIG. 1, a main magnetic pole layer 29 is formed by plating with an underlayer (not shown in the figure) provided thereunder. The main magnetic pole layer 29 is formed by plating using a ferromagnetic material, such as Ni—Fe, Co—Fe, Ni—Fe—Co, or the like, having a high saturated magnetic flux density. The main magnetic pole layer 29 is preferably formed of a material having a high saturated magnetic flux density Bs as compared to that of the yoke layer 28.

In this embodiment, the main magnetic pole layer 29 has a front portion 29F having a small film thickness t1 at the facing surface H1a side and a rear portion 29L having a large film thickness t2 at a rear side in a height direction. A front end surface 29F1 of the front portion 29F described above is exposed at the facing surface H1a.

Figure 2:
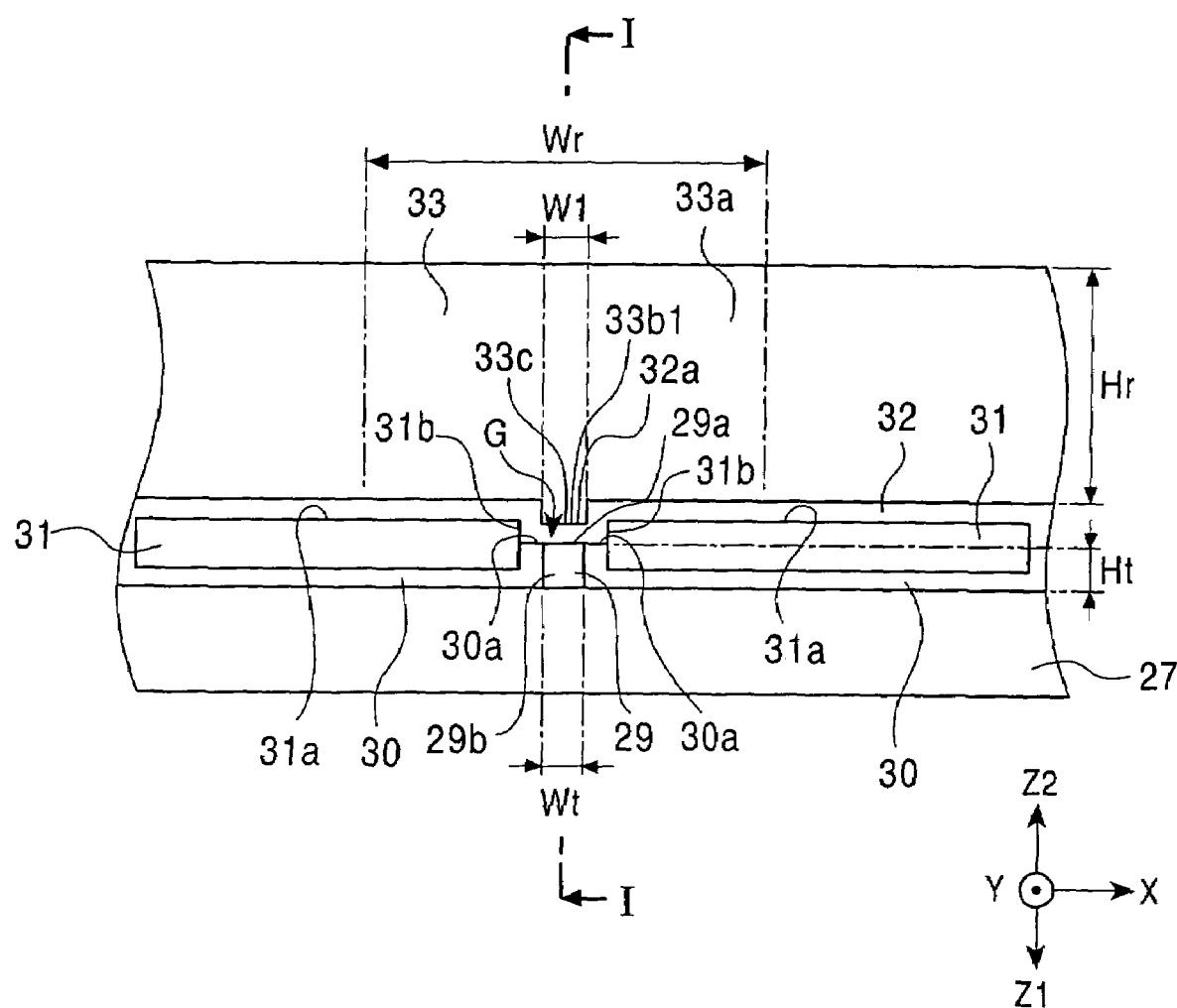
FIG. 2 is a front view of the magnetic head shown in FIG. 1 which is viewed from a side of a facing surface facing the recording medium.

FIG. 2 is a front view of the magnetic head shown in FIG. 1. FIG. 1 is a cross-sectional view showing the magnetic head which is taken on the chain line I-I shown in FIG. 2 and which is viewed along the arrows.

As shown in FIG. 2, the main magnetic pole layer 29 exposed at the facing surface H1a is formed so as to have a width dimension Wt in a track width direction (X direction in the figure). Although not shown in the figure, the dimension of the yoke layer 28 in the track width direction is larger than the width dimension Wt in the track width direction of the main magnetic pole layer 29.

As shown in FIG. 2, at two side parts of the main magnetic pole layer 29, a first non-magnetic layer 31 is formed with a second non-magnetic layer 30 provided therebetween. A top surface 30a of the second non-magnetic layer 30 is located at a position lower (Z1 direction in the figure) than that of a top surface 31a of the first non-magnetic layer 31.

In addition, a groove G is formed from inner side surfaces 31b of the first non-magnetic layer 31 provided at the two side parts of the main magnetic pole layer 29, the top surface 30a of the second non-magnetic layer 30, and a top surface 29a of the front portion 29F of the main magnetic pole layer 29. On the first non-magnetic layer 31, the second non-magnetic layer 30, and the main magnetic pole layer 29, a non-magnetic material layer 32 made of $Al_2O_3$, $SiO_2$, or the like is provided, and in the non-magnetic material layer 32, a concave portion 32a is formed above the groove G.

On the non-magnetic material layer 32, an auxiliary magnetic pole layer 33 is formed using a ferromagnetic material such as Permalloy. A front end surface 33a of the auxiliary magnetic pole layer 33 is exposed at the facing surface H1a facing a recording medium.

In addition, as shown in FIG. 1, at a side in a rear direction further from the facing surface H1a, a coupling portion 33c of the auxiliary magnetic pole layer 33, the main magnetic pole layer 29, and the yoke layer 28 are coupled with each other. Accordingly, a magnetic path through the auxiliary magnetic pole layer 33, the main magnetic pole layer 29, and the yoke layer 28 is formed.

The non-magnetic material layer 32 is also formed around the coupling portion 33c. On this non-magnetic material layer 32, a coil layer 34 is formed using a conductive material such as Cu. This coil layer 34 is formed by frame plating or the like so as to have a spiral (coil) pattern having a predetermined number of turns around the periphery of the coupling portion 33c. In this case, the coil layer 34 may be coiled around the periphery of the main magnetic pole layer 29 to form a toroidal shape.

On the coil layer 34, a coil insulating layer 35 is formed, and the auxiliary magnetic pole layer 33 extends along the upper portion of the insulating layer 35 and forms the coupling portion 33c.

In this embodiment, when being formed using a conductive metal, the non-magnetic material layer 32 located at a place at which the coil layer 34 is to be formed is removed by etching, or an insulating material layer is formed on the non-magnetic material layer 32.

A connection terminal 34a at a central side of the coil layer 34 is connected to a lead layer not shown in the figure. A recording current can be supplied from the lead layer to the coil layer 34.

In addition, the auxiliary magnetic pole layer 33 and the lead layer are covered with a protective layer (not shown) formed using an inorganic non-magnetic insulating material or the like.

In the magnetic head H1 shown in FIGS. 1 and 2, when a recording current is applied to the coil layer 34 through the lead layer, by a current magnetic field caused by the current passing through the coil layer 34, a recording magnetic field is induced in the auxiliary magnetic pole layer 33 and the yoke layer 28. As shown in FIG. 1, at the facing surface H1a, a leaked recording magnetic field from the front end surface 29F1 of the main magnetic pole layer 29 and the front end surface 33a of the auxiliary magnetic pole layer 33 penetrates the hard film Ma of the recording medium M and propagates in the soft film Mb.

As shown in FIG. 2, a height Ht of the front end surface 29F1 of the main magnetic pole layer 29 is smaller than a height Hr of the front end surface 33a of the auxiliary magnetic pole layer 33, and the width direction Wt in the track width direction (X direction in the figure) of the front end surface 29F1 of the main magnetic pole layer 29 is considerably smaller than a width dimension Wr in the same direction as described above of the front end surface 33a of the auxiliary magnetic pole layer 33. As a result, at the facing surface H1a, the area of the front end surface 29F1 of the main magnetic pole layer 29 is considerably smaller than that of the front end surface 33a of the auxiliary magnetic pole layer 33.

Accordingly, since a magnetic flux C of the leaked recording magnetic field is concentrated on the front end surface 29F1 of the main magnetic pole layer 29, the hard film Ma is magnetized in a direction perpendicular thereto by this concentrated magnetic flux C, and as a result, the magnetic data is recorded.

Subsequently, the features of this embodiment will be described.

As shown in FIG. 2, in the non-magnetic material layer 32, the concave portion 32a is formed above the groove G. In addition, the auxiliary magnetic pole layer 33 is formed to have a convex portion 33b at the facing surface H1a, the convex portion 33b extending to the main magnetic pole layer 29 and being located in the concave portion 32a.

In the magnetic head of this embodiment, since the front portion 29F of the main magnetic pole layer 29 is formed having a small thickness, even when the main magnetic pole layer 29 is inclined with respect to the tangential direction of rotation of the recording medium to produce a skew angle (yaw angle), the spread of the track width can be suppressed. In addition, since the main magnetic pole layer 29 is formed to have the rear portion 29L having a large thickness at the rear side in the height direction, the intensity of the magnetic field generated from the main magnetic pole layer 29 can be maintained at a high level.

In addition, since the auxiliary magnetic pole layer 33 is formed to have the convex portion 33b extending in the direction toward the main magnetic pole layer 29, the spread of a magnetic flux passing from the main magnetic pole layer 29 to the auxiliary magnetic pole layer 33 can be suppressed.

Furthermore, since the convex portion 33b is located in the concave portion 32a formed in the non-magnetic material layer 32, a magnetic flux B (see FIG. 1) passing in the perpendicular magnetic recording head from the main magnetic pole layer 29 to the auxiliary magnetic pole layer 33 is generated. Hence, compared to a related perpendicular magnetic recording head in which the intensity of the magnetic flux C generated from the main magnetic pole layer 29 is simply enhanced, an appropriate adjustment of the intensity of the magnetic flux C can be easily performed.

Accordingly, in the perpendicular magnetic recording head of the present invention, since the magnetic field generated therefrom can be effectively converged, and the edge of the recording track on the recording medium can be clearly defined, the substantial recording track width can be controlled within a predetermined range, and a higher recording density can be achieved by narrowing the track.

In addition, as shown in FIG. 1, when a bottom surface 33b1 of the convex portion 33b of the auxiliary magnetic pole layer 33 is located at a position lower (Z1 direction in the figure) than that of a top surface 29L1 of the rear portion 29L of the main magnetic pole layer 29, the main magnetic pole layer 29 and the auxiliary magnetic pole layer 33 are overlapped with each other in the thickness direction (Z1 or Z2 direction in the figure). As a result, it is preferable since an appropriate adjustment of the intensity of the magnetic flux B passing in the perpendicular magnetic recording head from the main magnetic pole layer 29 to the auxiliary magnetic pole layer 33 can be easily performed.

In addition, in this embodiment, the second non-magnetic layer 30 is provided between the main magnetic pole layer 29 and the first non-magnetic layer 31, and the top surface 30a of the second non-magnetic layer 30 is located at a position lower (Z1 direction in the figure) than that of the top surface 31a of the first non-magnetic layer 31.

The first non-magnetic layer 31 is formed, for example, of alumina ($Al_2O_3$), and the second non-magnetic layer 30 is formed of at least one of Ti, W, Cr, Ta, Mo, Au, Pd, Pt, NiCr, NiCu, Al—Si—O, a silicon oxide such as $SiO_2$, a Ti oxide, a W oxide, a Cr oxide, and a Ta oxide.

Alternatively, the first non-magnetic layer 31 is formed, for example, of at least one insulating material of $SiO_2$ and Al—Si—O, and the second non-magnetic layer 30 is formed of at least one of Ti, Cr, Ta, W, $WO_3$, Mo, Au, Pd, Pt, NiCr, NiCuCr, and CrOX. When the materials described above are selected for the first non-magnetic layer 31 and the second non-magnetic layer 30, in etching of the first non-magnetic layer 31 and the second non-magnetic layer 30 under the same condition, an etching rate of the second non-magnetic layer 30 is higher than that of the first non-magnetic layer 31, and as a result, compared to a magnetic head having no second non-magnetic layer 30, which will be described later, the main magnetic pole layer 29 can be appropriately planarized.

In addition, when the first non-magnetic layer 31, the second non-magnetic layer 30, and the main magnetic pole layer 29 are etched under the same condition, etching rates of the second non-magnetic layer 30 and the main magnetic pole layer 29 are higher than that of the first non-magnetic layer 31.

Since the magnetic flux C can be converged, a dimension W1 of the bottom surface 33b1 of the convex portion 33b in the track width direction is preferably small as compared to the dimension Wt of the front end surface 29F1 of the main magnetic pole layer 29 in the track width direction. However, in the present invention, the dimension W1 of the bottom surface 33b1 of the convex portion 33b in the track width direction may be larger than or may be equal to the dimension Wt of the front end surface 29F1 of the main magnetic pole layer 29 in the track width direction.

A method for manufacturing the perpendicular magnetic recording head shown in FIGS. 1 and 2 will be described.

Figure 3A:
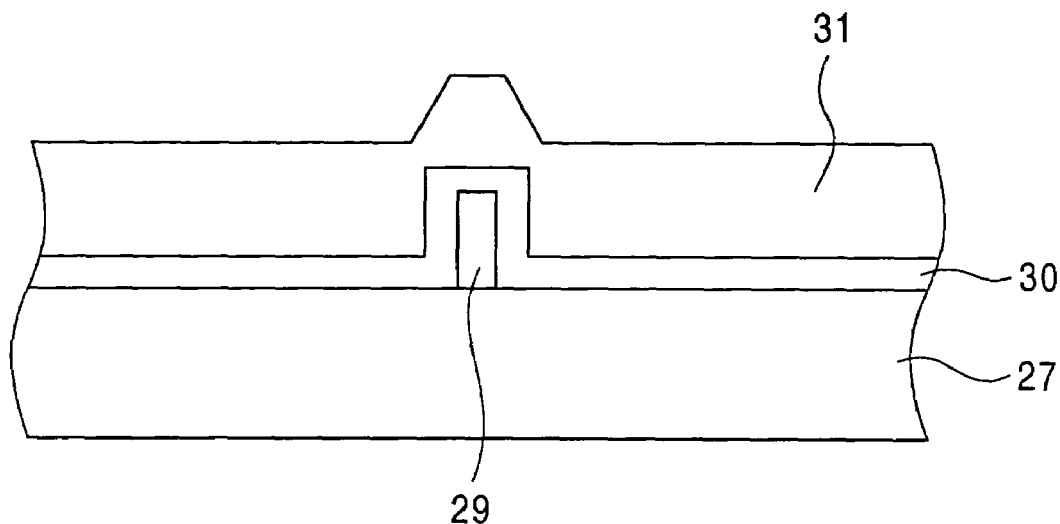
FIG. 3A is a front view of a semi-finished magnetic head for illustrating a step of a manufacturing method of the present invention.
Figure 3B:
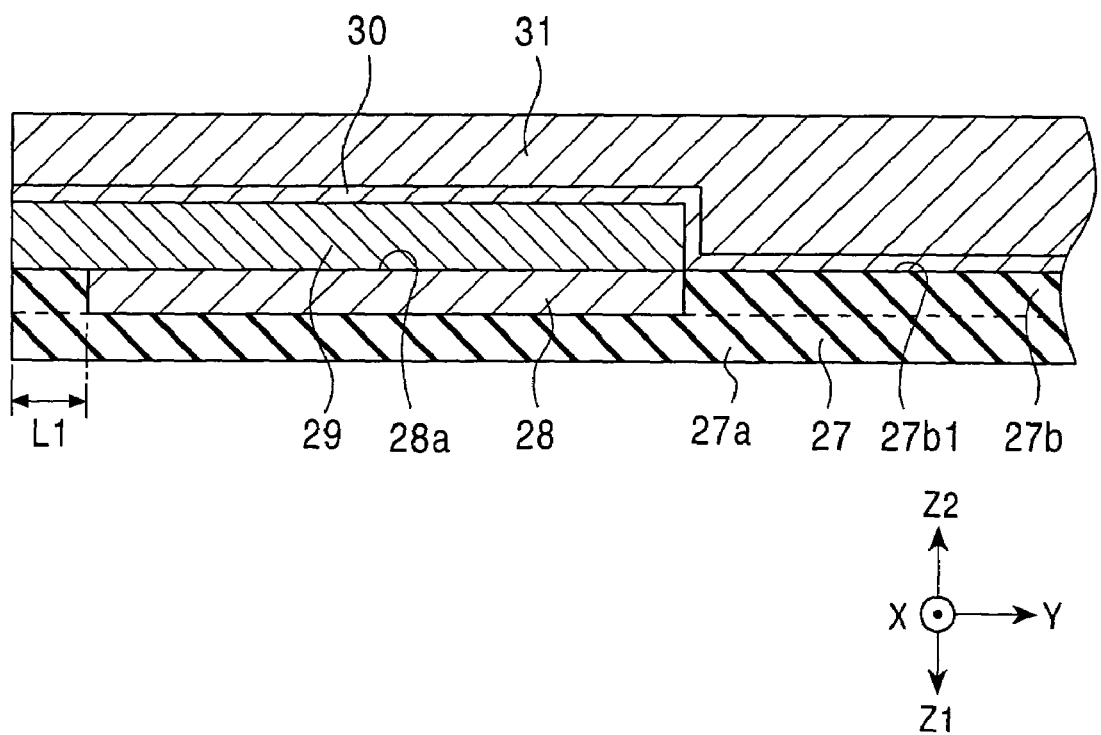
FIG. 3B is a cross-sectional view of a semi-finished magnetic head for illustrating a step of a manufacturing method of the present invention.

FIGS. 3A to 6B show individual steps of a method for manufacturing the perpendicular magnetic recording head described above, and each figure indicated by a numeral followed by A, such as FIG. 3A, is a partial front view of a semi-finished magnetic head viewed from the facing surface H1a side, and each figure indicated by a numeral followed by B, such as FIG. 3B, is a vertical cross-sectional view thereof.

In a step shown in FIGS. 3A and 3B, on the reading portion HR, the isolation layer 27 is formed using an insulating material such as alumina or $SiO_2$, and the yoke layer 28 made of a ferromagnetic material is buried in the isolation layer 27.

First, a first isolation layer 27a is formed by sputtering or deposition using alumina or $SiO_2$, and the first isolation layer 27a is polished by CMP treatment or the like to produce a planarized surface. Next, on a position on the first isolation layer 27a at a predetermined distance L1 from the facing surface H1a, the yoke layer 28 is formed by frame plating using a ferromagnetic material such as NiFe. Subsequently, a second isolation layer 27b is formed by sputtering or deposition using alumina or $SiO_2$ so as to cover the first isolation layer 27a and the yoke layer 28, and after the second isolation layer 27b is polished by CMP treatment or the like to expose a top surface 28a of the yoke layer 28, this top surface 28a and a top surface 27b1 of the second isolation layer 27b are planarized to be flush with each other.

Next, on the top surface 28a of the yoke layer 28 and the top surface 27b1 of the second isolation layer 27b, which are flush each other, a plating underlying film (not shown) is formed by sputtering. The plating underlying film is formed using a magnetic material such as NiFe.

Next, by using the plating underlying film as an electrode, frame plating is performed with a frame made of a resist layer to form the main magnetic pole layer 29. The main magnetic pole layer 29 is formed of a ferromagnetic material having a saturated magnetic flux higher than that of the yoke layer 28. In particular, the main magnetic pole layer 29 may be formed of Ni—Fe, Fe—Co—Rh, Fe—Co, Fe—Co—Ni, or the like. Subsequently, the resist layer is removed. In the step shown in FIGS. 3A and 3B for forming the main magnetic pole layer 29 by plating, the thickness of the main magnetic pole layer 29 must be larger than a final thickness thereof which is to be obtained after every manufacturing step is performed. After the resist layer is removed, the plating underlying film exposed around the main magnetic pole layer 29 is removed by ion milling or the like. In addition, the main magnetic pole layer 29 may be milled in the track width direction so that the dimension thereof in the track width direction is decreased.

Furthermore, after the second non-magnetic layer 30 is provided at the two side parts, a rear part, and a top part of the main magnetic pole layer 29, the first non-magnetic layer 31 is provided on the second non-magnetic layer 30.

The first non-magnetic layer 31 is formed, for example, of alumina ($Al_2O_3$), and the second non-magnetic layer 30 is formed of at least one of Ti, W, Cr, Ta, Mo, Au, Pd, Pt, NiCr, NiCu, Al—Si—O, a silicon oxide such as $SiO_2$, a Ti oxide, a W oxide, a Cr oxide, and a Ta oxide.

Alternatively, the first non-magnetic layer 31 is formed, for example, of at least one insulating material of $SiO_2$ and Al—Si—O, and the second non-magnetic layer 30 is formed of at least one of Ti, Cr, Ta, W, $WO_3$, Mo, Au, Pd, Pt, NiCr, NiCu, and CrOX.

When the materials described above are selected for the first non-magnetic layer 31 and the second non-magnetic layer 30, in etching of the first non-magnetic layer 31 and the second non-magnetic layer 30 under the same condition, the etching rate of the second non-magnetic layer 30 is higher than that of the first non-magnetic layer 31.

In addition, when the first non-magnetic layer 31, the second non-magnetic layer 30, and the main magnetic pole layer 29 are etched under the same condition, the etching rates of the second non-magnetic layer 30 and the main magnetic pole layer 29 are higher than that of the first non-magnetic layer 31.

For example, etching conditions for comparing the etching rates of the first non-magnetic layer 31, the second non-magnetic layer 30, and the main magnetic pole layer 29 are as follows.

Figure 4A:
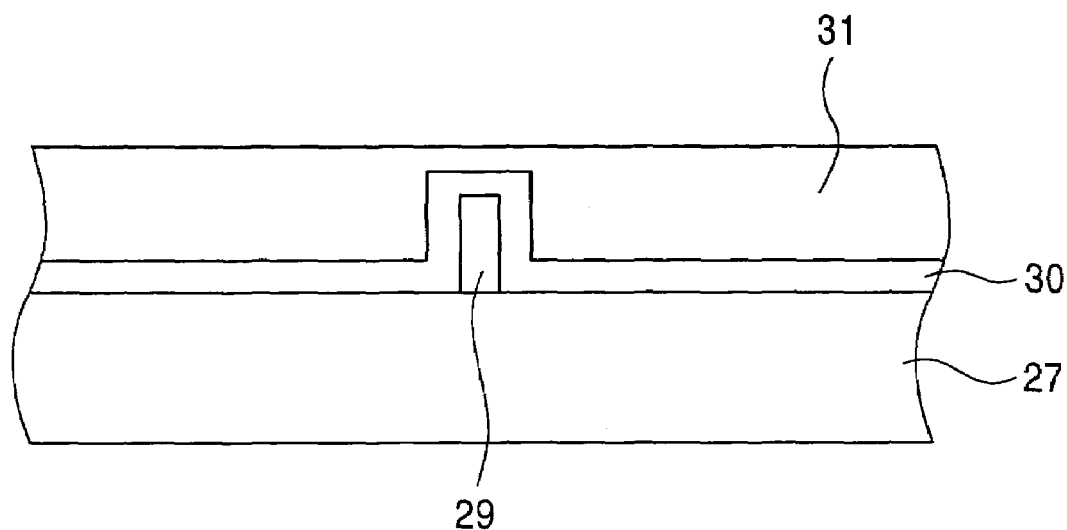
FIG. 4A is a front view of a semi-finished magnetic head for illustrating a step of a manufacturing method of the present invention.
Figure 4B:
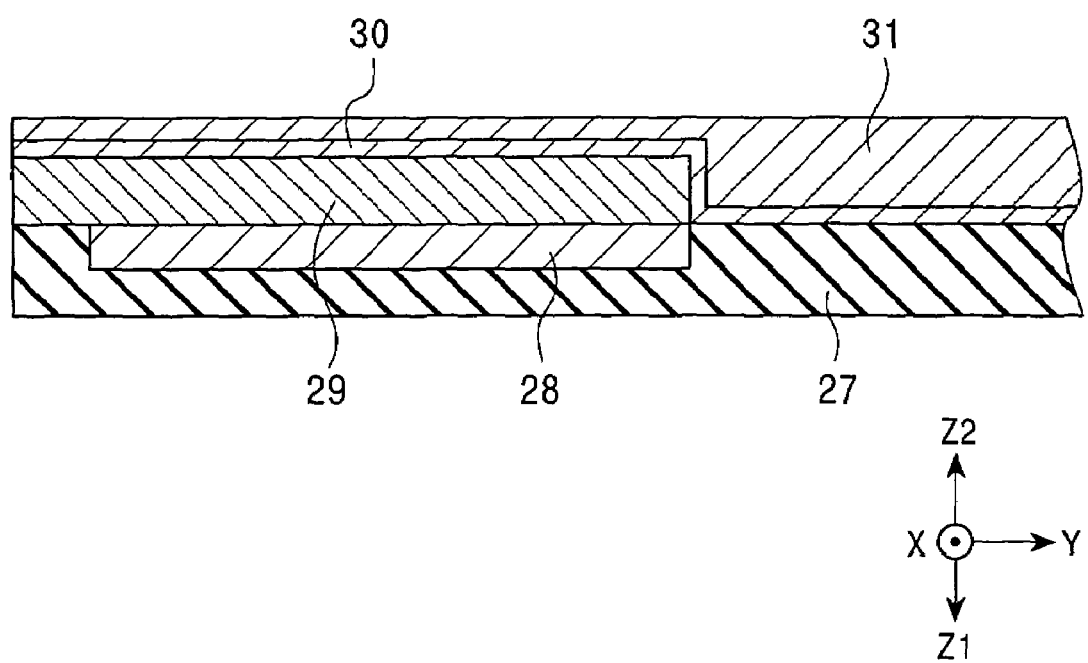
FIG. 4B is a cross-sectional view of a semi-finished magnetic head for illustrating a step of a manufacturing method of the present invention.

Etching gas: neutral argon (Ar)
Beam voltage of ion milling: 400 V
Beam current of ion milling: 300 mA
Inclined beam angle in ion milling: 45° with respect to the normal line of a substrate surface Next, in a step shown in FIGS. 4A and 4B, the first non-magnetic layer 31 is polished by CMP processing to form a planarized surface. In this step, the top surface of the main magnetic pole layer 29 and the top surface of the second non-magnetic layer 30 may be exposed so as to be flush with the top surface of the first non-magnetic layer 31.

Figure 5A:
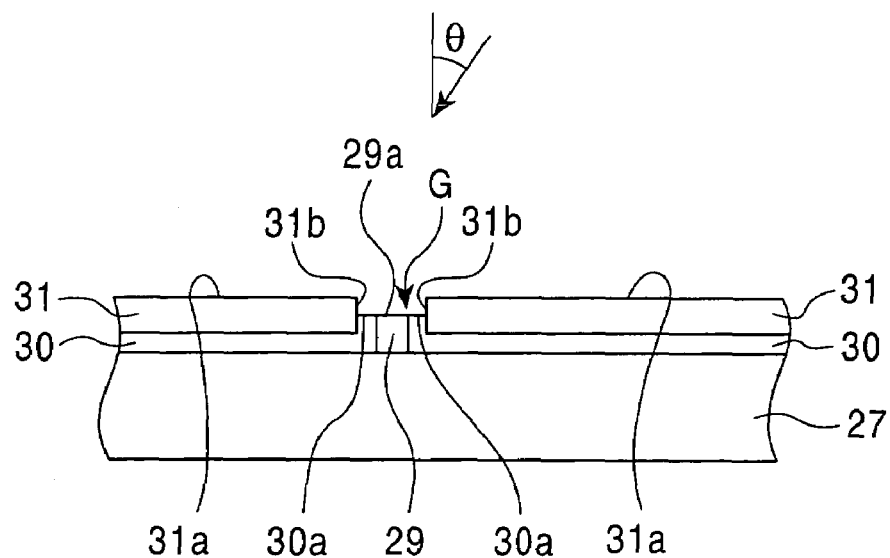
FIG. 5A is a front view of a semi-finished magnetic head for illustrating a step of a manufacturing method of the present invention.
Figure 5B:
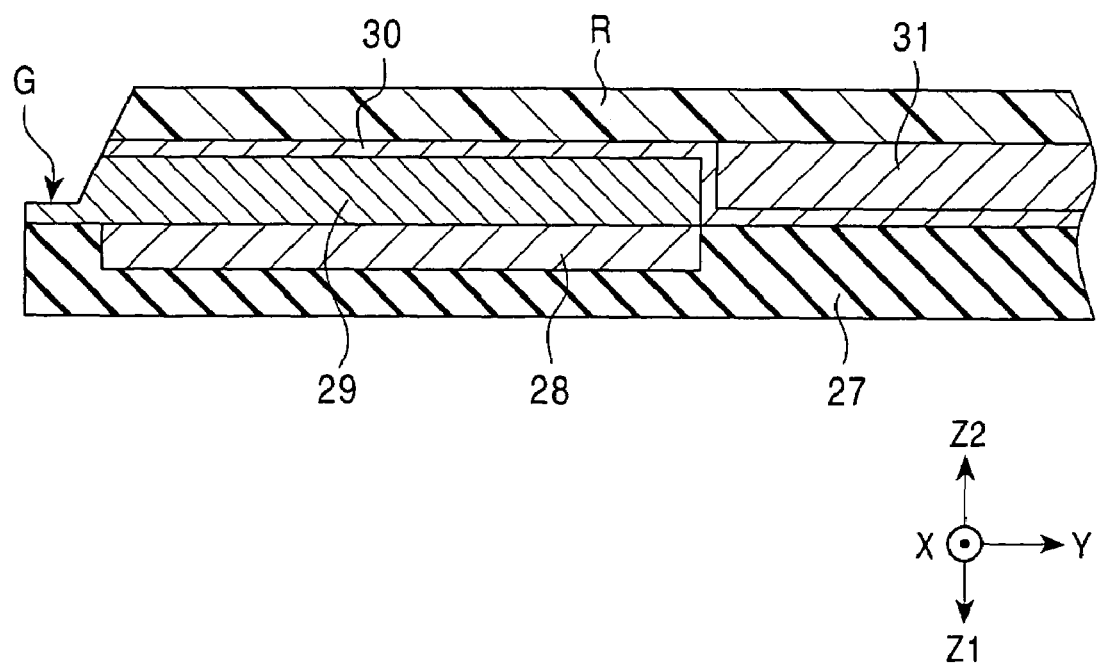
FIG. 5B is a cross-sectional view of a semi-finished magnetic head for illustrating a step of a manufacturing method of the present invention.

Next, in a step shown in FIGS. 5A and 5B, a rear portion of the first non-magnetic layer 31 overlapping the rear portion 29L of the main magnetic pole layer 29 is masked by a resist layer R which is patterned.

Next, a front portion of the first non-magnetic layer 31, which is not masked, is milled by dry etching (ion milling), and subsequently, a front portion of the second non-magnetic layer 30 and the front portion 29F of the main magnetic pole layer 29 are then milled.

In this step, the thickness t1 of the front portion 29F of the main magnetic pole layer 29 is formed small as compared to the thickness t2 of the rear portion 29L, and in addition, the groove G can be formed from the inner side surfaces 31b of the first non-magnetic layer 31, the top surface 30a of the second non-magnetic layer 30, and the top surface 29a of the front portion 29F of the main magnetic pole layer 29.

The main magnetic pole layer 29 made of a magnetic material and the first non-magnetic layer 31 made of an insulating material have etching rates different from each other, and the etching rate of the main magnetic pole layer 29 by dry etching (ion milling) is high as compared to that of the first non-magnetic layer 31.

Hence, when the front portion 29F of the main magnetic pole layer 29 and the front portion of the first non-magnetic layer 31 are milled by dry etching (ion milling), the groove G can be formed from the inner side surfaces 31b of the first non-magnetic layer 31 and the top surface 29a of the front portion 29F of the main magnetic pole layer 29.

Figure 6A:
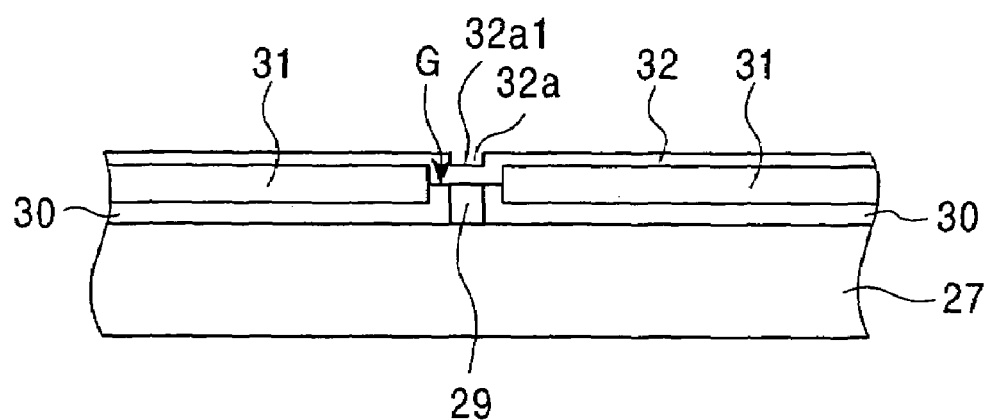
FIG. 6A is a front view of a semi-finished magnetic head for illustrating a step of a manufacturing method of the present invention.
Figure 6B:
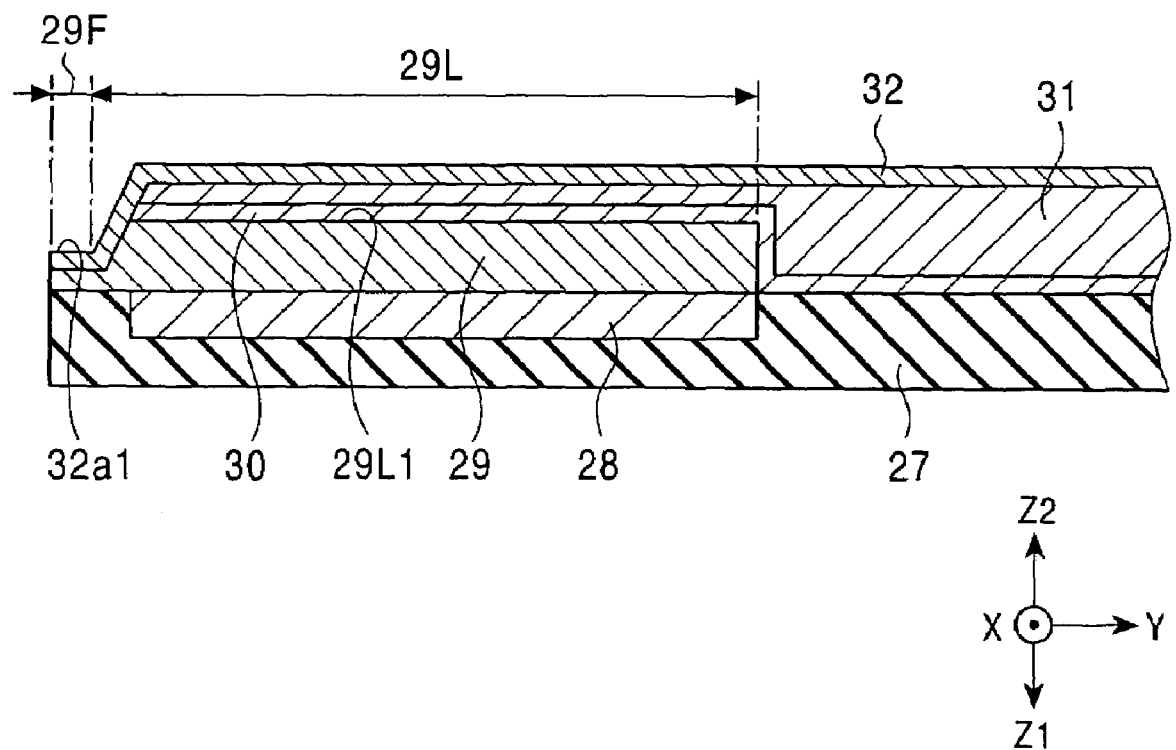
FIG. 6B is a cross-sectional view of a semi-finished magnetic head for illustrating a step of a manufacturing method of the present invention.

After the resist layer R is removed, in a step shown in FIGS. 6A and 6B, on the first non-magnetic layer 31 and the main magnetic pole layer 29, the non-magnetic material layer 32 is formed, and in a part of the non-magnetic material layer 32 above the groove G, the concave portion 32a is formed. In this step, the resist layer R may be allowed to remain for insulating the coil layer 34.

In this step, in order to enable a top surface 32a1 of the concave portion 32a provided in the non-magnetic material layer 32 to locate at a position lower (Z1 direction in the figure) than that of the top surface 29L1 of the rear portion 29L of the main magnetic pole layer 29, the thickness of the non-magnetic material layer 32 and the etching amount of the main magnetic pole layer 29 are adjusted.

After the step shown in FIGS. 6A and 6B, the coil layer 34, the coil insulating layer 35, and the auxiliary magnetic pole layer 33 are formed. Before the auxiliary magnetic pole layer 33 is formed, in order to form the coupling portion 33c of the auxiliary magnetic pole layer 33, a through-hole is provided in the coil insulating layer 35, the non-magnetic material layer 32, the first non-magnetic layer 31, and the second non-magnetic layer 30, so that the top surface of the rear portion 29L of the main magnetic pole layer 29 is exposed.

At the facing surface H1a side, the auxiliary magnetic pole layer 33 is formed on the non-magnetic material layer 32, and in the concave portion 32a of the non-magnetic material layer 32, the convex portion 33b of the auxiliary magnetic pole layer 33 is formed. The auxiliary magnetic pole layer 33 is formed by plating to have the convex portion 33b extending in the direction to the main magnetic pole layer 29 (Z1 direction in the figure).

In this embodiment, since the auxiliary magnetic pole layer 33 is formed above the groove G with the non-magnetic material layer 32 provided therebetween, the groove G being formed using the difference in etching rate by dry etching (ion milling) between the main magnetic pole layer 29 and the first non-magnetic layer 31, the convex portion 33b of the auxiliary magnetic pole layer 33 can be easily formed in the concave portion 32a so as to extend in the direction toward the main magnetic pole layer 29.

In addition, in this embodiment, as described above, the thickness of the non-magnetic material layer 32 is adjusted so that the top surface 32a1 of the concave portion 32a provided therein is located at a position lower (Z1 direction in the figure) than that of the top surface 29L1 of the rear portion 29L of the main magnetic pole layer 29. Accordingly, the bottom surface 33b1 of the convex portion 33b of the auxiliary magnetic pole layer 33 is located at a position lower (Z1 direction in the figure) than that of the top surface 29L1 of the rear portion 29L of the main magnetic pole layer 29.

When the bottom surface 33b1 of the convex portion 33b of the auxiliary magnetic pole layer 33 is located at a position lower than that of the top surface 29L1 of the rear portion 29L of the main magnetic pole layer 29, it becomes easy to appropriately adjust the intensity of the magnetic flux B (see FIG. 1) passing in the perpendicular magnetic recording head from the main magnetic pole layer 29 to the auxiliary magnetic pole layer 33.

In addition, in this embodiment, after the second non-magnetic layer 30 is formed on the top part and the two side parts of the main magnetic pole layer 29, the first non-magnetic layer 31 is formed on a top part and two side parts of the second non-magnetic layer 30. In addition, in the dry etching step shown in FIGS. 5A and 5B, the top surface 29a of the front portion 29F of the main magnetic pole layer 29, the top surface 30a of the front portion of the second non-magnetic layer 30, and the top surface 31a of the front portion of the first non-magnetic layer 31 are formed by milling using a dry etching method so that the top surface 30a of the second non-magnetic layer 30 is located at a position lower (Z1 direction in the figure) than that of the top surface 31a of the first non-magnetic layer 31.

In this embodiment, since the materials of the first non-magnetic layer 31 and the second non-magnetic layer 30 are selected as described above, in etching of the first non-magnetic layer 31 and the second non-magnetic layer 30 under the same condition, the etching rate of the second non-magnetic layer 30 is higher than that of the first non-magnetic layer 31.

Accordingly, when the main magnetic pole layer 29, the second non-magnetic layer 30, and the first non-magnetic layer 31 are milled by dry etching, since being milled faster than the first non-magnetic layer 31, the second non-magnetic layer 30 facilitates the formation of the groove G. As a result, deep excavation of the main magnetic pole layer 29 to form the top surface 29a and the planarization thereof are easily performed, and as a result, reliable formation of the groove G made of the inner side surfaces 31b of the first non-magnetic layer 31, the top surface 30a of the second non-magnetic layer 30, and the top surface 29a of the front portion 29F of the main magnetic pole layer 29 is easily performed. In this embodiment in which the second non-magnetic layer 30 is formed, compared to a manufacturing method, which will be described later, in which the second non-magnetic layer 30 is not formed, even when the dimension of the main magnetic pole layer 29 in the track width direction (dimension in the X direction in the figure) is decreased, the groove G and the concave portion 32a of the non-magnetic material layer 32 can be reliably formed.

In the step shown in FIGS. 5A and 5B, the top surface 29a of the front portion 29F of the main magnetic pole layer 29, the top surface 30a of the front portion of the second non-magnetic layer 30, and the top surface 31a of the front portion of the first non-magnetic layer 31 are formed by milling using ion milling.

In this embodiment, when the first non-magnetic layer 31 is formed, for example, of alumina ($Al_2O_3$), and the second non-magnetic layer 30 is formed of at least one of Ti, W, Cr, Ta, Mo, Au, a silicon oxide such as $SiO_2$, a Ti oxide, a W oxide such as $WO_3$, a Cr oxide such as CrOX, and a Ta oxide, the second non-magnetic layer 30 can be selectively milled by reactive ion etching.

In addition, even when the first non-magnetic layer 31 is formed, for example, of $SiO_2$, and the second non-magnetic layer 30 is formed of at least one of W, $WO_3$, Cr, CrOx, and Mo, the second non-magnetic layer 30 can also be selectively milled by reactive ion etching.

Figure 5C:
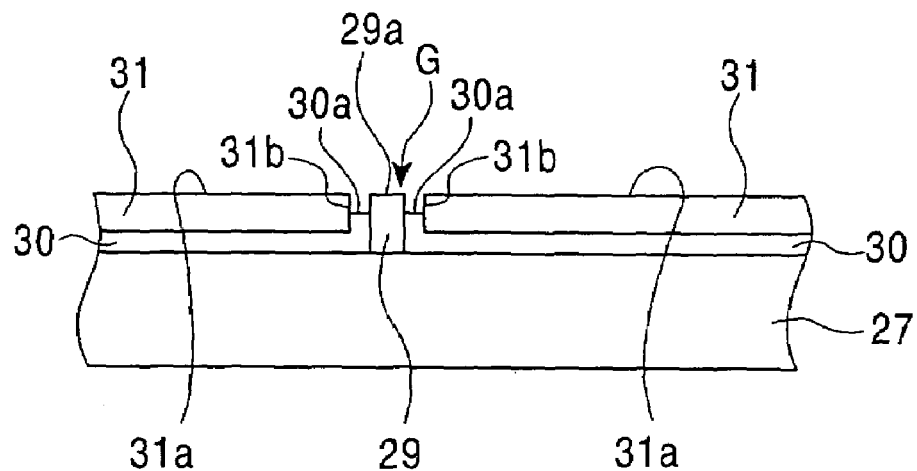
FIG. 5C is a front view of a semi-finished magnetic head for illustrating a step of a manufacturing method of the present invention.
Figure 5D:
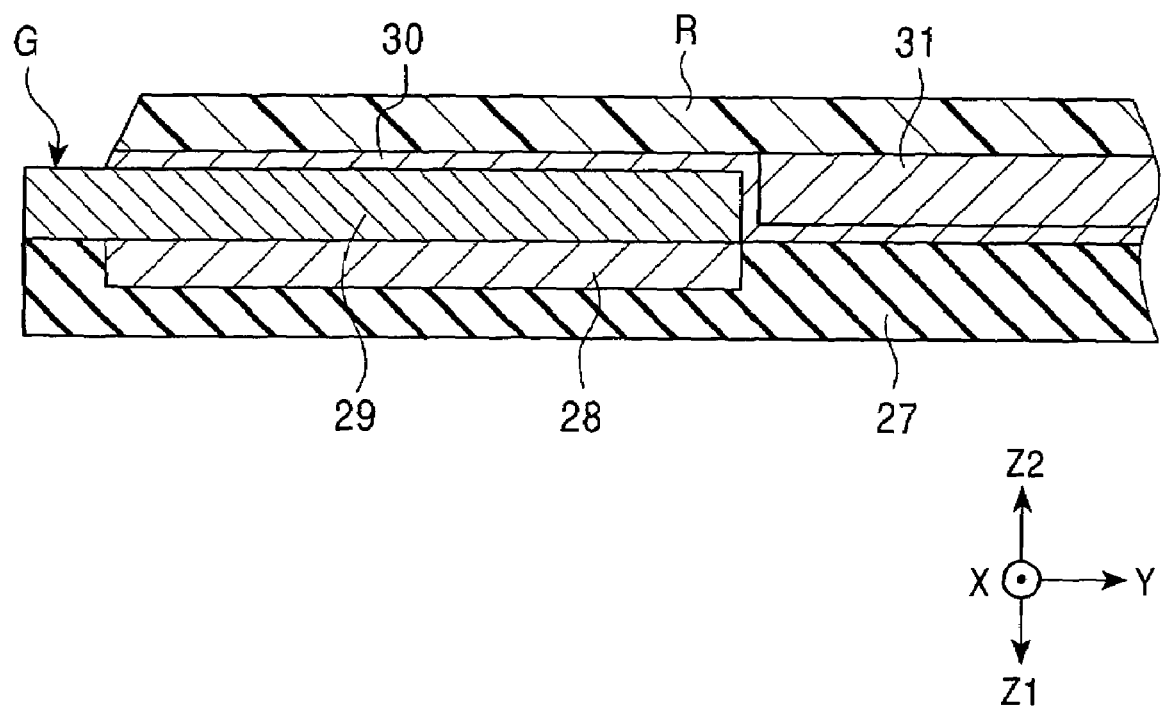
FIG. 5D is a cross-sectional view of a semi-finished magnetic head for illustrating a step of a manufacturing method of the present invention.

When the second non-magnetic layer 30 is selectively milled by reactive ion etching, as shown in FIGS. 5C and 5D, the front portion of the second non-magnetic layer 30 is only milled to form the top surface 30a. Subsequently, by milling the front portion 29F of the main magnetic pole layer 29 to form the top surface 29a, the state shown in FIGS. 5A and 5B can be obtained.

Figure 7:
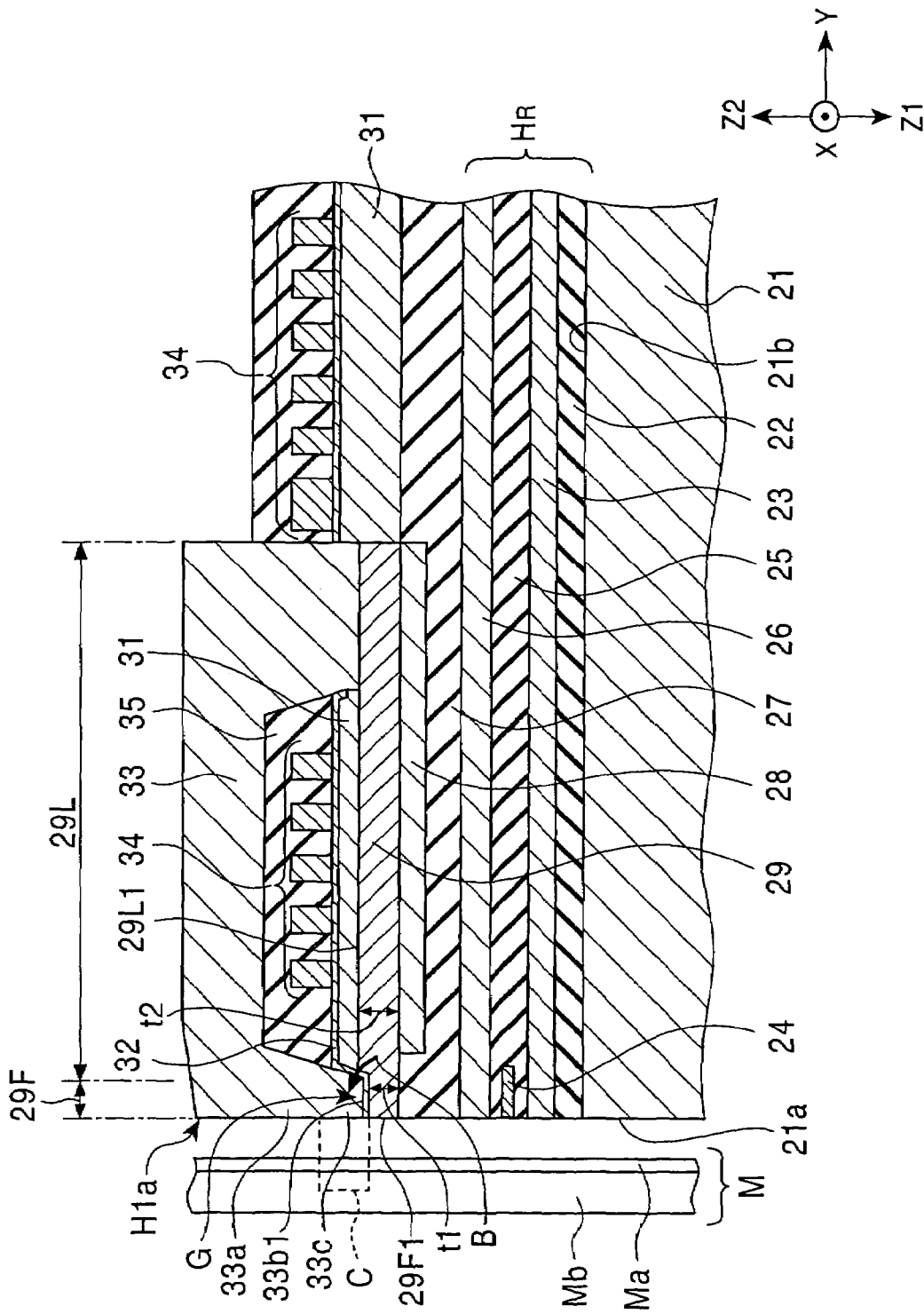
FIG. 7 is a cross-sectional view of a perpendicular magnetic recording head facing to a recording medium, according to a second embodiment of the present invention.

FIG. 7 is a vertical cross-sectional view of a perpendicular magnetic recording head of a second embodiment of the present invention. The difference of the perpendicular magnetic recording head shown in FIG. 7 from that shown in FIG. 1 is that the second non-magnetic layer 30 is not formed. In this embodiment, the structures and the materials of the constituent elements having the same reference numerals are the same as those described in FIGS. 1 and 2, unless otherwise stated.

Also in this embodiment, the main magnetic pole layer 29 has the front portion 29F having a small film thickness t1 at the facing surface H1a side and the rear portion 29L having a large film thickness t2 at the rear side in the height direction. The front end surface 29F1 of the front portion 29F at the facing surface H1a side is exposed at the facing surface H1a.

Figure 8:
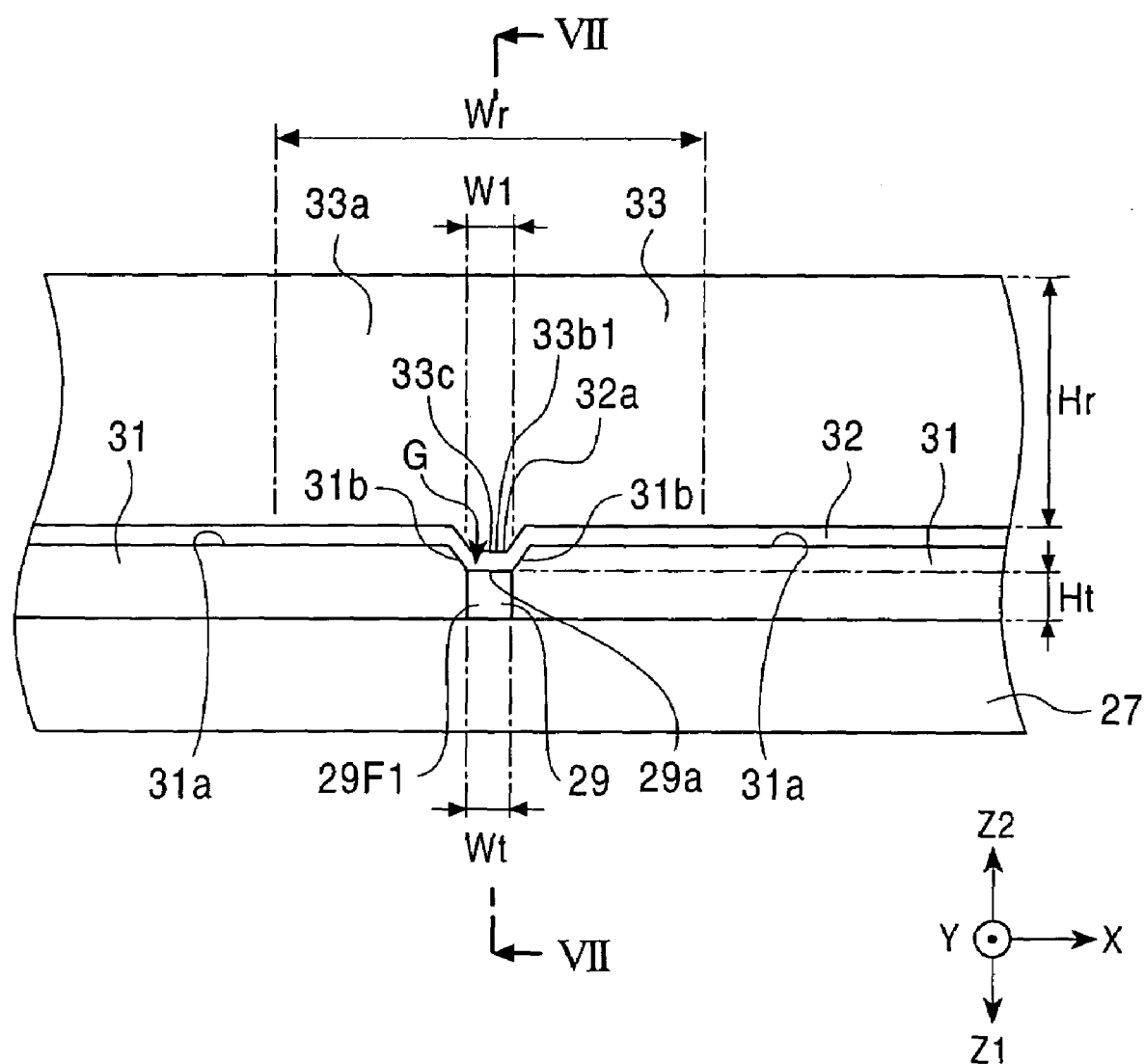
FIG. 8 is a front view of the magnetic head shown in FIG. 7 which is viewed from a side of a facing surface facing the recording medium.

FIG. 8 is a front view of the magnetic head shown in FIG. 7. FIG. 7 is a cross-sectional view showing the magnetic head which is taken on the chain line VII-VII shown in FIG. 8 and which is viewed along the arrows.

As shown in FIG. 8, at the two side parts of the main magnetic pole layer 29, the first non-magnetic layer 31 is formed. The first non-magnetic layer 31 is formed, for example, of alumina (Al$_2$O$_3$), Ti, W, Cr, Ta, Mo, Au, Pd, Pt, NiCr, NiCu, Al—Si—O, a silicon oxide such as SiO$_2$, a Ti oxide, a W oxide, a Cr oxide, and a Ta oxide.

In addition, the inner side surfaces 31b of the first non-magnetic layer 31, which are provided at the two side parts of the main magnetic pole layer 29, and the top surface 29a of the front portion 29F of the main magnetic pole layer 29 form the groove G. In this embodiment in which the second non-magnetic layer 30 is not formed, the inner side surfaces 31b of the first non-magnetic layer 31 are likely to be inclined with respect to the direction of the film surface. However, the inner side surfaces 31b of the first non-magnetic layer 31 may also be surfaces perpendicular to the film surface.

On the first non-magnetic layer 31 and the main magnetic pole layer 29, the non-magnetic material layer 32 made of alumina, SiO$_2$, or the like is provided, and in the non-magnetic material layer 32, the concave portion 32a is formed above the groove G.

On the non-magnetic material layer 32, the auxiliary magnetic pole layer 33 made of a ferromagnetic material such as Permalloy is provided. The front end surface 33a of the auxiliary magnetic pole layer 33 is exposed at the facing surface H1a facing a recording medium.

Also in the magnetic head H1 shown in FIGS. 7 and 8, when a recording current is applied to the coil layer 34, by a current magnetic field caused by the current passing through the coil layer 34, a recording magnetic field is induced in the auxiliary magnetic pole layer 33 and the yoke layer 28. As shown in FIG. 7, at the facing surface H1a, the leaked recording magnetic field from the front end surface 29F1 of the main magnetic pole layer 29 and the front end surface 33a of the auxiliary magnetic pole layer 33 penetrates the hard film Ma of the recording medium M and propagates in the soft film Mb. Since the front end surface 29F1 of the main magnetic pole layer 29 has an area considerably small as that of the front end surface 33a of the auxiliary magnetic pole layer 33, the magnetic flux C of the leaked recording magnetic field is concentrated on the front end surface 29F1 of the main magnetic pole layer 29. Accordingly, the hard film Ma is perpendicularly magnetized by this concentrated magnetic flux C, whereby magnetic data is recorded.

The features of this embodiment will be described.

As shown in FIGS. 7 and 8, in the non-magnetic material layer 32, the concave portion 32a is formed above the groove G. In addition, the auxiliary magnetic pole layer 33 is formed to have the convex portion 33b which extends to the main magnetic pole layer 29 and which is located in the concave portion 32a.

In the magnetic head of this embodiment, since the front portion 29F of the main magnetic pole layer 29 is formed having a small thickness, even when the main magnetic pole layer 29 is inclined with respect to the tangential direction of rotation of the recording medium to produce a skew angle (yaw angle), the spread of the track width can be suppressed. In addition, since the main magnetic pole layer 29 is formed to have the rear portion 29L having a large thickness in the height direction, the intensity of the magnetic field generated from the main magnetic pole layer 29 can be maintained at a high level.

In addition, since the auxiliary magnetic pole layer 33 is formed to have the convex portion 33b extending in the direction toward the main magnetic pole layer 29, the spread of the magnetic flux passing from the main magnetic pole layer 29 to the auxiliary magnetic pole layer 33 can be suppressed.

Furthermore, since the convex portion 33b is located in the concave portion 32a formed in the non-magnetic material layer 32, the magnetic flux B (see FIG. 7) passing in the perpendicular magnetic recording head from the main magnetic pole layer 29 to the auxiliary magnetic pole layer 33 is generated. Hence, compared to a related perpendicular magnetic recording head in which the intensity of the magnetic flux C generated from the main magnetic pole layer 29 is simply enhanced, an appropriate adjustment of the intensity of the magnetic flux C can be easily performed.

Accordingly, in the perpendicular magnetic recording head of the present invention, since the magnetic field generated therefrom can be effectively converged, and the edge of the recording track on the recording medium can be clearly defined, the substantial recording track width can be controlled within a predetermined range, and a higher recording density can be achieved by narrowing the track.

In addition, when the bottom surface 33b1 of the convex portion 33b of the auxiliary magnetic pole layer 33 is located at a position lower (Z1 direction in the figure) than that of the top surface 29L1 of the rear portion 29L of the main magnetic pole layer 29, the main magnetic pole layer 29 and the auxiliary magnetic pole layer 33 are overlapped with each other in the thickness direction (Z1 or Z2 direction in the figure). As a result, it is preferable since an appropriate adjustment of the intensity of the magnetic flux B passing in the perpendicular magnetic recording head from the main magnetic pole layer 29 to the auxiliary magnetic pole layer 33 can be easily performed.

Since the magnetic flux C can be converged, the dimension W1 in the track width direction of the bottom surface 33b1 of the convex portion 33b is preferably smaller than the dimension Wt in the track width direction of the front end surface 29F1 of the main magnetic pole layer 29. However, in the present invention, the dimension W1 in the track width direction of the bottom surface 33b1 of the convex portion 33b may be larger than or may be equal to the dimension Wt in the track width direction of the front end surface 29F1 of the main magnetic pole layer 29.

A method for manufacturing the perpendicular magnetic recording head shown in FIGS. 7 and 8 will be described.

Figure 9A:
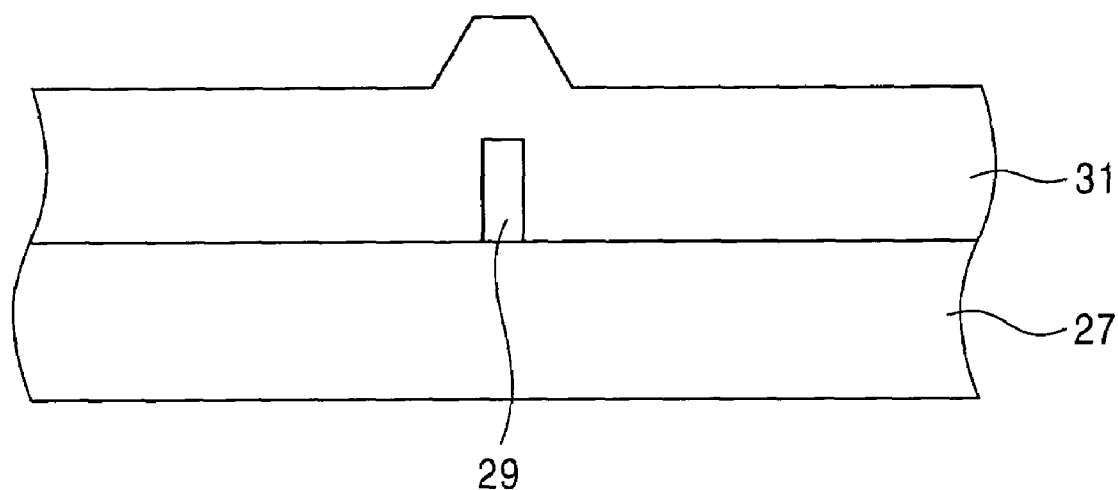
FIG. 9A is a front view of a semi-finished magnetic head for illustrating a step of a manufacturing method of the present invention.
Figure 9B:
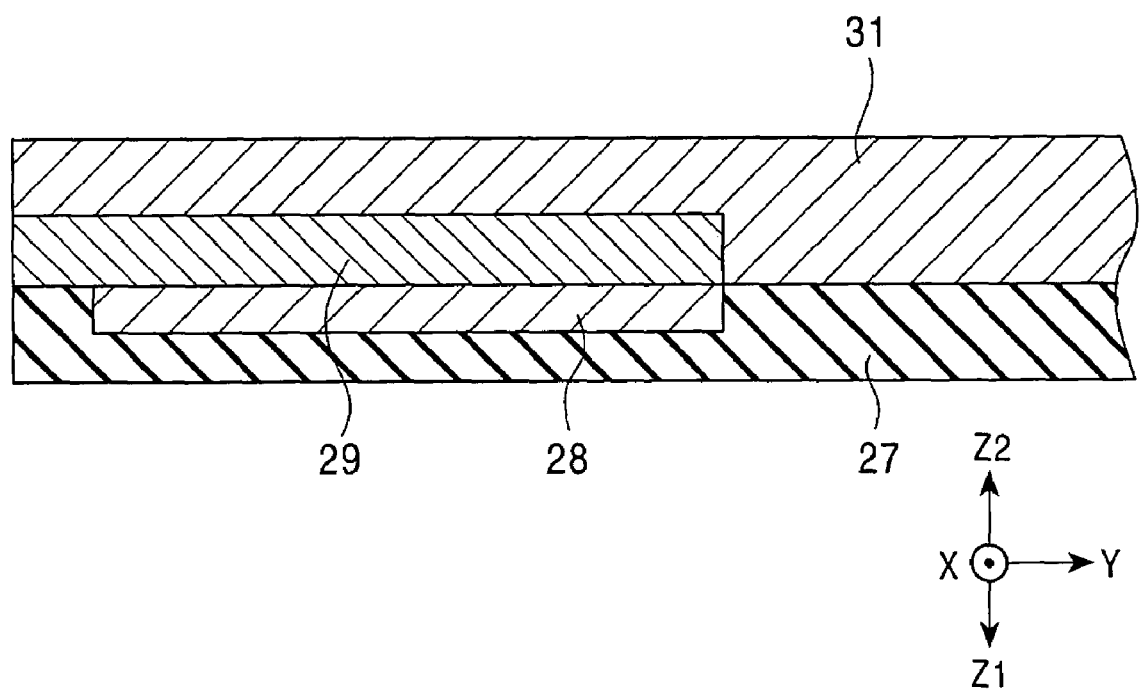
FIG. 9B is a cross-sectional view of a semi-finished magnetic head for illustrating a step of a manufacturing method of the present invention.

FIGS. 9A to 12B show individual steps of the manufacturing method mentioned above, and each figure indicated by a numeral followed by A, such as FIG. 9A, is a partial front view of the magnetic head viewed from the facing surface H1a side, and each figure indicated by a numeral followed by B, such as FIG. 9B, is a vertical cross-sectional view thereof. The difference between the manufacturing method shown in FIGS. 9A to 12B from that shown in FIGS. 3A to 6B is the presence of the second non-magnetic layer 30, and the structures and the materials of the constituent elements having the same reference numerals are the same as those described in FIGS. 3A to 6B, unless otherwise stated.

In a step shown in FIGS. 9A and 9B, on the reading portion HR, the isolation layer 27 is formed using an insulating material such as alumina or SiO$_2$, and the yoke layer 28 made of a ferromagnetic material is buried in the isolation layer 27.

Next, the main magnetic pole layer 29 is formed by frame plating using a frame made of a resist layer.

Furthermore, the first non-magnetic layer 31 is provided at the two side parts, the rear part, and the top part of the main magnetic pole layer 29. In this embodiment, the first non-magnetic layer 31 is formed, for example, of at least one of alumina (Al$_2$O$_3$), Ti, W, Cr, Ta, Mo, Au, Pd, Pt, NiCr, NiCu, Al—Si—O, a silicon oxide such as SiO$_2$, a Ti oxide, a W oxide, a Cr oxide, and a Ta oxide.

Figure 10A:
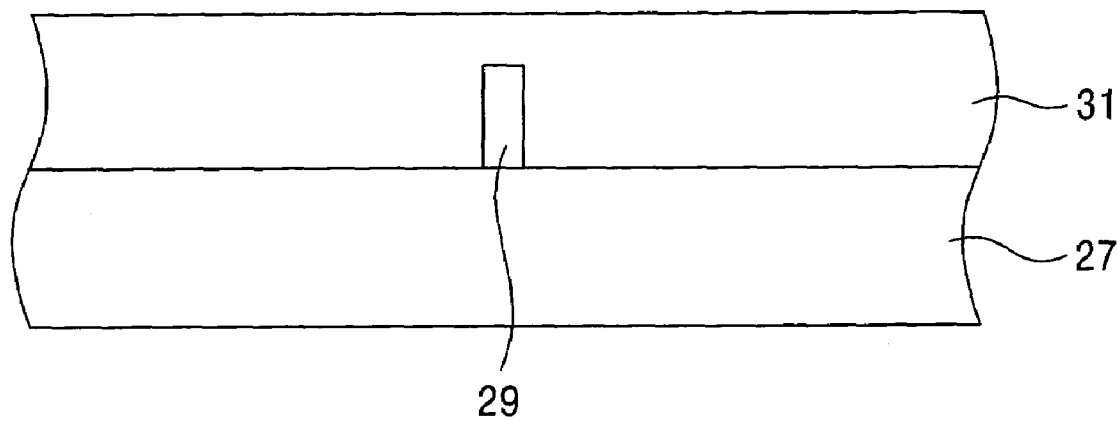
FIG. 10A is a front view of a semi-finished magnetic head for illustrating a step of a manufacturing method of the present invention.
Figure 10B:
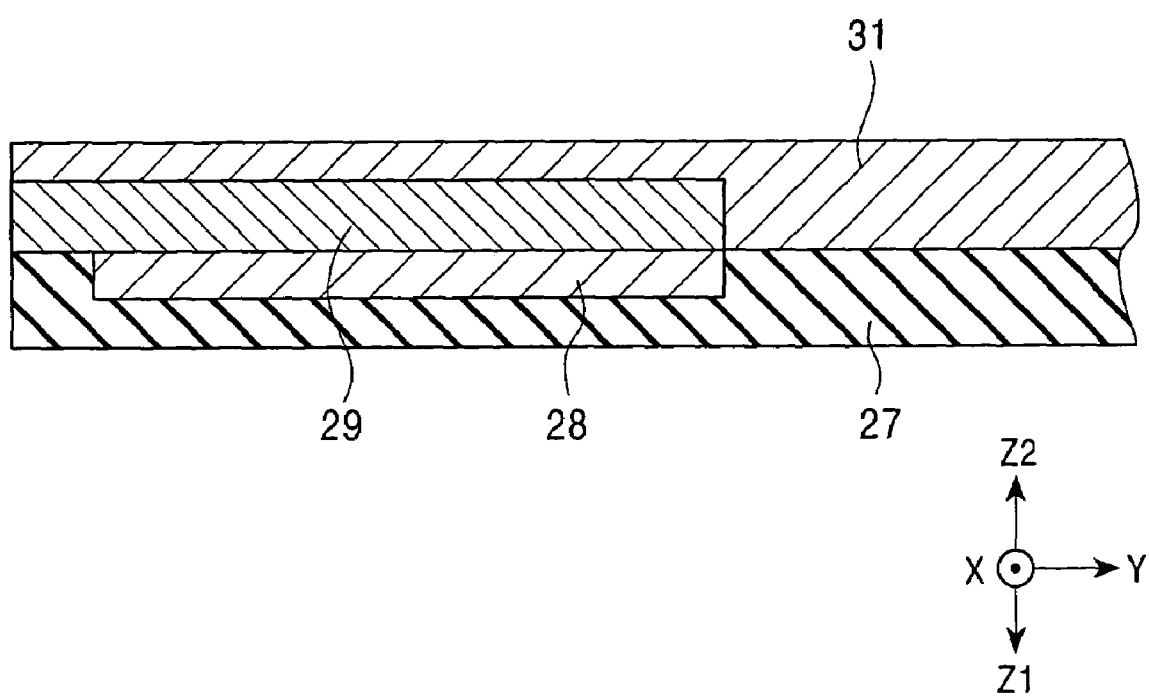
FIG. 10B is a cross-sectional view of a semi-finished magnetic head for illustrating a step of a manufacturing method of the present invention.

Next, in a step shown in FIGS. 10A and 10B, the first non-magnetic layer 31 is polished by CMP processing to form a planarized surface. In this step, the main magnetic pole layer 29 may be exposed so as to be flush with the first non-magnetic layer 31.

Figure 11A:
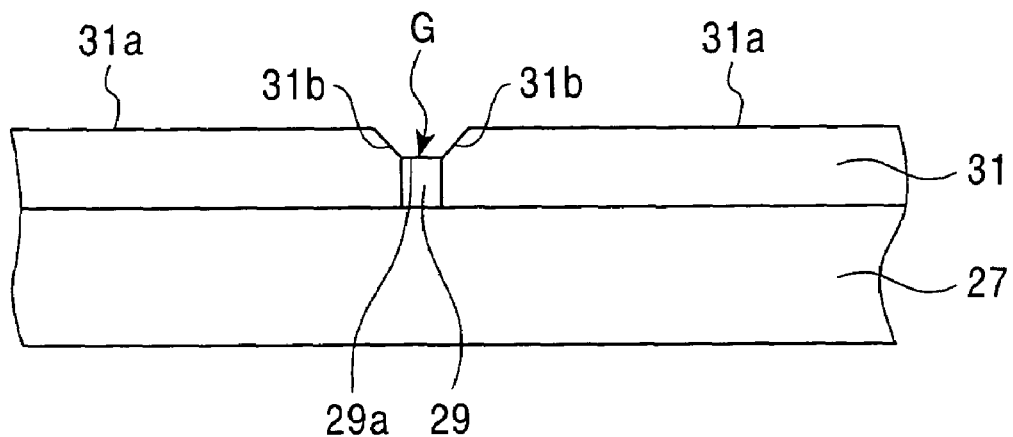
FIG. 11A is a front view of a semi-finished magnetic head for illustrating a step of a manufacturing method of the present invention.
Figure 11B:
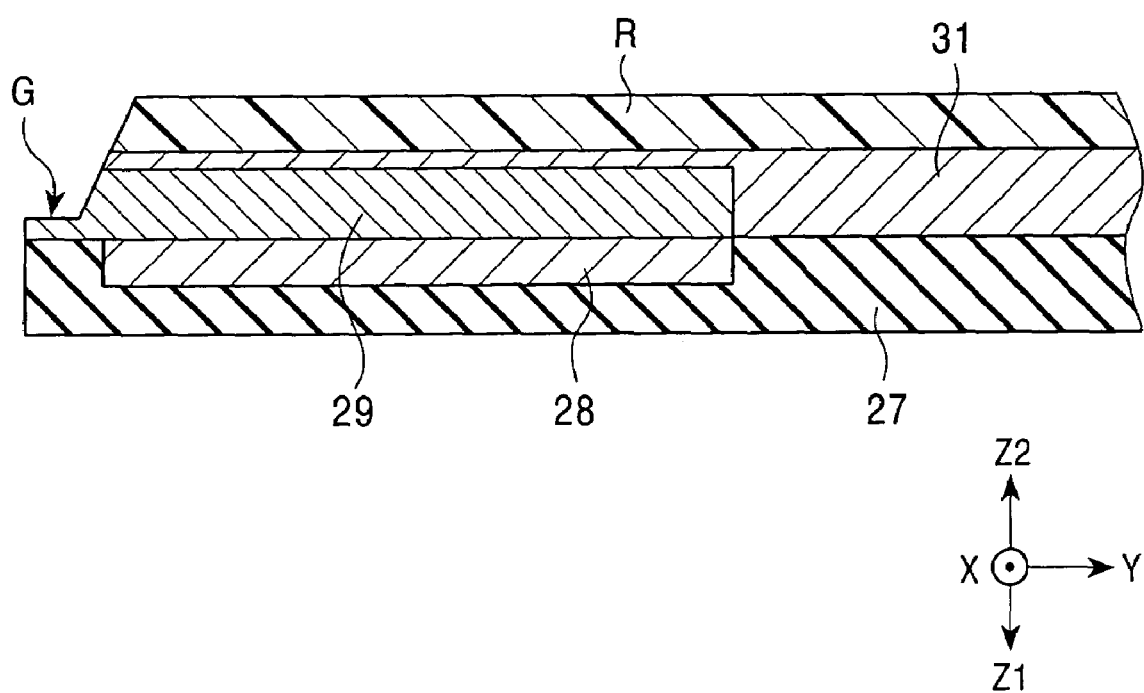
FIG. 11B is a cross-sectional view of a semi-finished magnetic head for illustrating a step of a manufacturing method of the present invention.

Next, in a step shown in FIGS. 11A and 11B, the rear portion of the first non-magnetic layer 31 overlapping the rear portion 29L of the main magnetic pole layer 29 is masked by the resist layer R which is patterned.

Subsequently, dry etching (ion milling) is performed for the front portion of the first non-magnetic layer 31, which is not masked, and then, the front portion 29F of the main magnetic pole layer 29 is then milled.

In this step, the thickness t1 of the front portion 29F of the main magnetic pole layer 29 is formed small as compared to the thickness t2 of the rear portion 29L, and in addition, the groove G can be formed from the inner side surfaces 31b of the first non-magnetic layer 31 and the top surface 29a of the front portion 29F of the main magnetic pole layer 29.

The main magnetic pole layer 29 made of a magnetic material and the first non-magnetic layer 31 made of an insulating material have etching rates different from each other, and the etching rate of the main magnetic pole layer 29 by dry etching is high as compared to that of the first non-magnetic layer 31.

Hence, when the front portion 29F of the main magnetic pole layer 29 and the front portion of the first non-magnetic layer 31 are milled by dry etching, the groove G can be formed from the inner side surfaces 31b of the first non-magnetic layer 31 and the top surface 29a of the front portion 29F of the main magnetic pole layer 29.

Figure 12A:
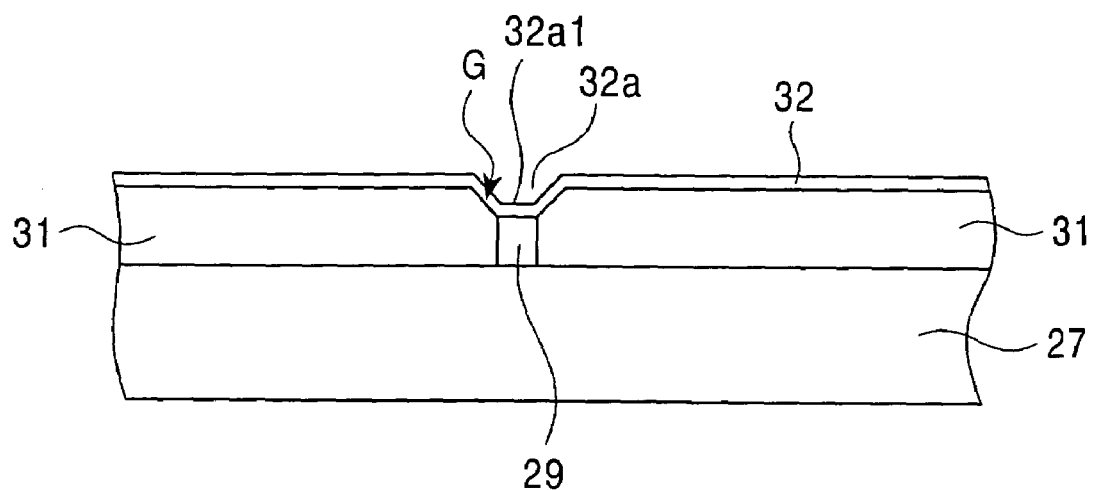
FIG. 12A is a front view of a semi-finished magnetic head for illustrating a step of a manufacturing method of the present invention.
Figure 12B:
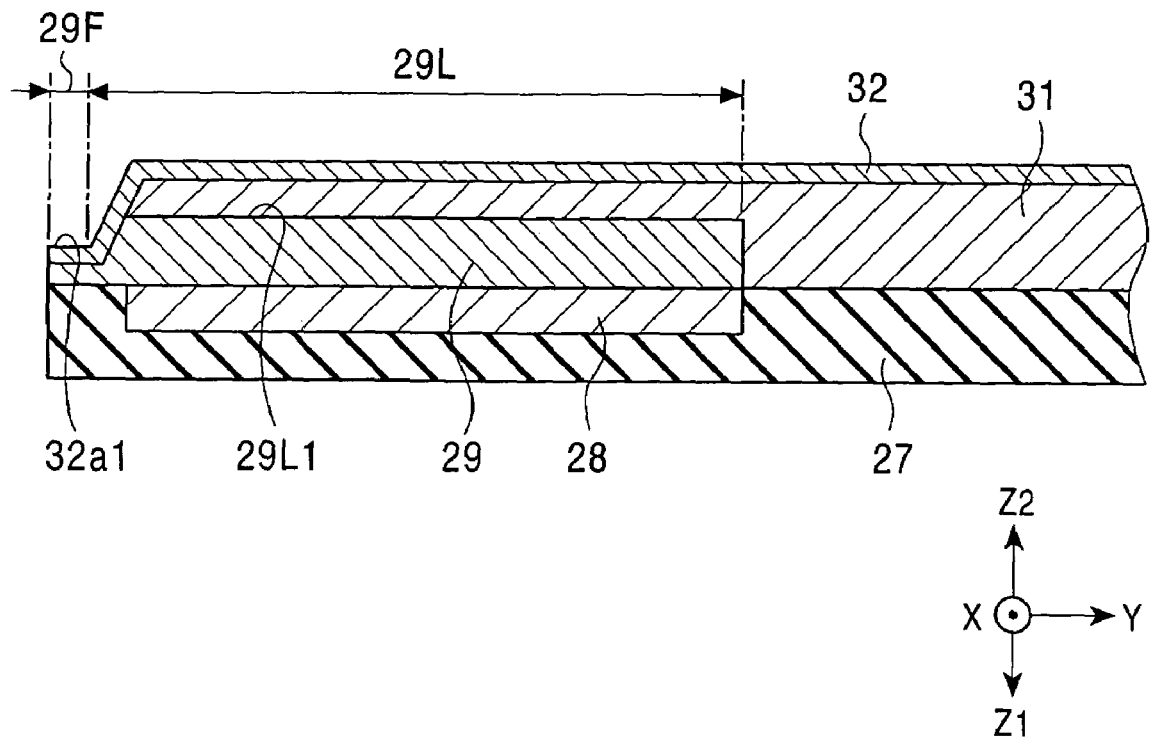
FIG. 12B is a cross-sectional view of a semi-finished magnetic head for illustrating a step of a manufacturing method of the present invention.
Figure 13:
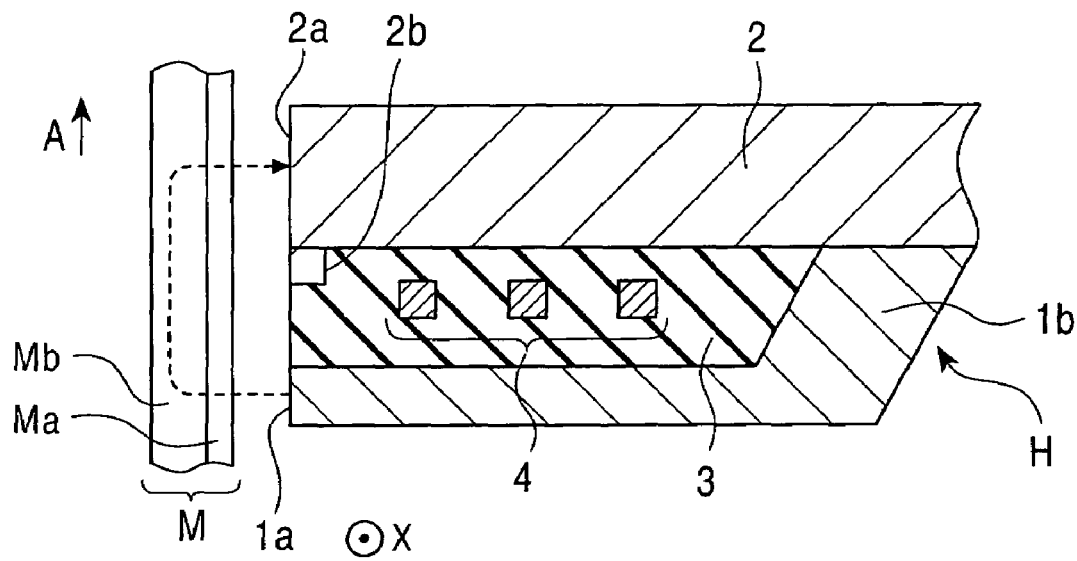
FIG. 13 is a cross-sectional view of a related perpendicular magnetic recording head facing to a recording medium.
Figure 14:
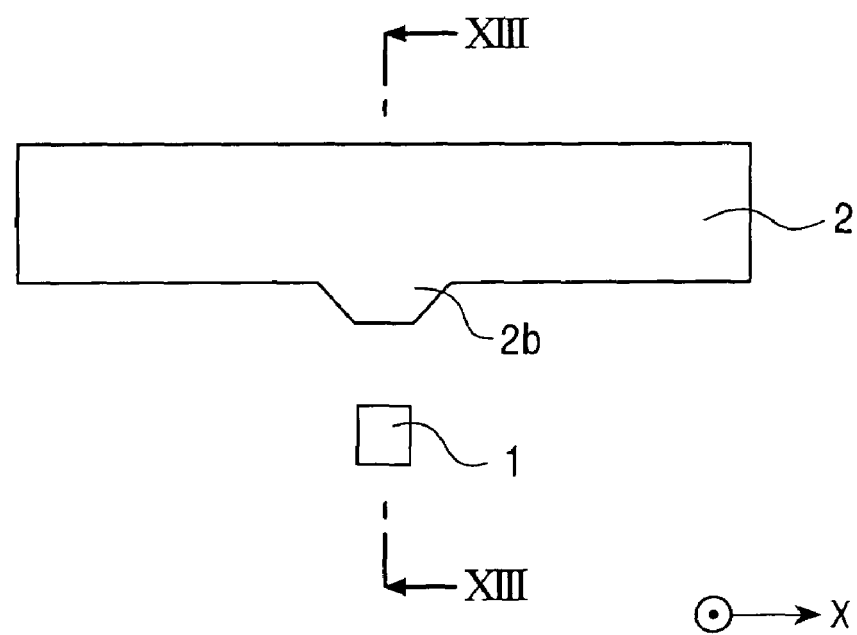
FIG. 14 is a front view of the magnetic head shown in FIG. 13 which is viewed from a side of a facing surface facing the recording medium.
Figure 15:
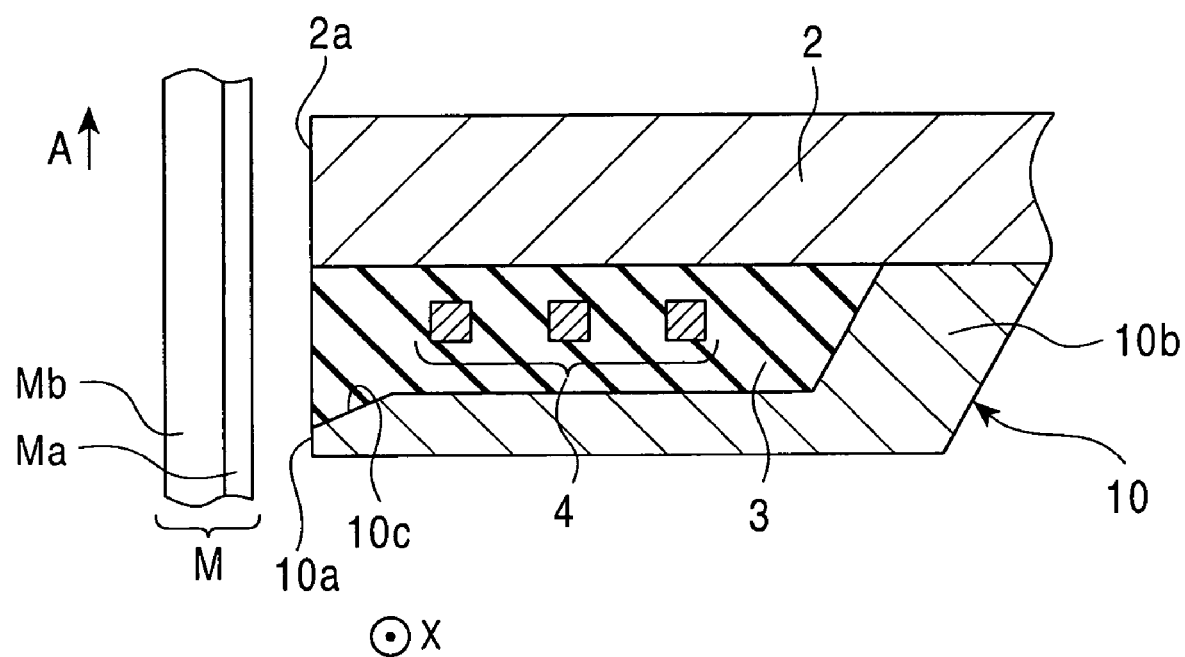
FIG. 15 is a cross-sectional view of a related perpendicular magnetic recording head facing to a recording medium.

After the resist layer R is removed, in a step shown in FIGS. 12A and 12B, on the first non-magnetic layer 31 and the main magnetic pole layer 29, the non-magnetic material layer 32 is formed, and in a part of the non-magnetic material layer 32 above the groove G, the concave portion 32a is formed.

In this step, in order to enable the top surface 32a1 of the concave portion 32a provided in the non-magnetic material layer 32 to locate at a position lower (Z1 direction in the figure) than that of the top surface 29L1 of the rear portion 29L of the main magnetic pole layer 29, the thickness of the non-magnetic material layer 32 and the etching amount of the main magnetic pole layer 29 are adjusted.

After the step shown in FIGS. 12A and 12B, the coil layer 34, the coil insulating layer 35, and the auxiliary magnetic pole layer 33 are formed. In order to form the coupling portion 33c of the auxiliary magnetic pole layer 33, before the auxiliary magnetic pole layer 33 is formed, a through-hole is provided in the coil insulating layer 35, the non-magnetic material layer 32, and the first non-magnetic layer 31, so that the top surface of the rear portion 29L of the main magnetic pole layer 29 is exposed.

In this embodiment, when being formed using a conductive metal, the non-magnetic material layer 32 located at a place at which the coil layer 34 is to be formed is removed by etching, or an insulating material layer is formed on the non-magnetic material layer 32.

At the facing surface H1a side, the auxiliary magnetic pole layer 33 is formed on the non-magnetic material layer 32. In the concave portion 32a of the non-magnetic material layer 32, the convex portion 33b of the auxiliary magnetic pole layer 33 is formed. The auxiliary magnetic pole layer 33 is formed by plating to have the convex portion 33b extending in the direction to the main magnetic pole layer 29 (Z1 direction in the figure).

In this embodiment, since the auxiliary magnetic pole layer 33 is formed above the groove G with the non-magnetic material layer 32 provided therebetween, the groove G being formed by using the difference in etching rate by dry etching between the main magnetic pole layer 29 and the first non-magnetic layer 31, the convex portion 33b of the auxiliary magnetic pole layer 33 can be easily formed so as to extend in the direction to the main magnetic pole layer 29.

In addition, in this embodiment, as described above, the thickness of the non-magnetic material layer 32 and the etching amount of the main magnetic pole layer 29 are adjusted so that the top surface 32a1 of the concave portion 32a provided in the non-magnetic material layer 32 is located at a position lower (Z1 direction in the figure) than that of the top surface 29L1 of the rear portion 29L of the main magnetic pole layer 29. Accordingly, the bottom surface 33b1 of the convex portion 33b of the auxiliary magnetic pole layer 33 is located at a position lower (Z1 direction in the figure) than that of the top surface 29L1 of the rear portion 29L of the main magnetic pole layer 29.

When the bottom surface 33b1 of the convex portion 33b of the auxiliary magnetic pole layer 33 is located at a position lower than that of the top surface 29L1 of the rear portion 29L of the main magnetic pole layer 29, an appropriate adjustment of the intensity of the magnetic flux B (see FIG. 7) passing in the perpendicular magnetic recording head from the main magnetic pole layer 29 to the auxiliary magnetic pole layer 33 can be easily performed.

In addition, on the facing surface H1a facing to a recording medium, a protective layer made of a DLC (diamond like carbon) having a thickness of 15 to 70 Å may be formed.

What is claimed is:

1. A perpendicular magnetic recording head comprising:
an auxiliary magnetic pole layer;
a main magnetic pole layer facing thereto provided at a side of a facing surface facing a recording medium, the main magnetic pole layer being composed of a front portion having a small thickness provided at the facing surface side and a rear portion having a large thickness provided at a rear side apart from the facing surface in a height direction, the main magnetic pole layer having a front end surface of the rear portion between a top surface of the front portion and a top surface of the rear portion;
a first non-magnetic layer having inner side surfaces which are provided at two side parts of the main magnetic pole layer in a track width direction at the facing surface;
a non-magnetic material layer which is provided on the first non-magnetic layer and the main magnetic pole layer and which is present between the auxiliary magnetic pole layer and the main magnetic pole layer at the facing surface facing the recording medium; and
a coil layer provided at the rear side in the height direction for applying a recording magnetic field to the auxiliary magnetic pole layer and the main magnetic pole layer,
wherein data is recorded on the recording medium by a perpendicular magnetic field generated from the main magnetic pole layer, the inner side surfaces of the first non-magnetic layer and a top surface of the front portion of the main magnetic pole layer form a groove exposed at the facing surface, the non-magnetic material layer has a concave portion, which is exposed at a facing surface facing a recording medium, on the groove, the auxiliary magnetic pole layer includes a base portion that has a larger thickness and a greater width in track width direction than the front portion of the main magnetic pole layer at the facing surface, and further includes a convex portion at the facing surface side, the convex portion extending in the direction from the base portion to the main magnetic pole layer and being placed in the concave portion, the width of the convex portion in track width direction being smaller than the width of the base portion but greater than the width of the main magnetic pole layer, a bottom surface of the convex portion of the auxiliary magnetic pole layer is located at a position lower than that of a top surface of the rear portion of the main magnetic pole layer, and a rear end surface that reaches to the bottom surface of the convex portion is, at a rear side apart from the facing surface in a height direction, provided at a position closer to the facing surface than the front end surface of the rear portion of the main magnetic pole layer.

2. The perpendicular magnetic recording head according to claim 1, wherein the formed groove includes the inner side surfaces of the first non-magnetic layer, the inner front surfaces of the first non-magnetic layer provided at a rear side farther apart from the facing surface in a height direction between the inner side surfaces, and the top surface of the front portion of the main magnetic pole layer.

3. The perpendicular magnetic recording head according to claim 1, wherein the formed groove includes the inner side surfaces of the first non-magnetic layer, the inner front surfaces of the first non-magnetic layer provided at a rear side farther apart from the facing surface in a height direction between the inner side surfaces, the top surface of the front portion of the main magnetic pole layer, and the front end surface of the rear portion of the main magnetic pole layer.

4. The perpendicular magnetic recording head according to claim 1, further comprising a second non-magnetic layer provided between the main magnetic pole layer and the first non-magnetic layer, wherein a top surface of the second non-magnetic layer is located at a position lower than that of a top surface of the first non-magnetic layer.

5. The perpendicular magnetic recording head according to claim 4, wherein, when the first non-magnetic layer and the second non-magnetic layer are etched under the same condition, an etching rate of the second non-magnetic layer is higher than an etching rate of the first non-magnetic layer.

6. The perpendicular magnetic recording head according to claim 4, wherein, when the first non-magnetic layer, the second non-magnetic layer, and the main magnetic pole layer are etched under the same condition, etching rates of the second non-magnetic layer and the main magnetic pole layer are higher than an etching rate of the first non-magnetic layer.

7. The perpendicular magnetic recording head according to claim 4, wherein the first non-magnetic layer is formed of alumina ($Al_2O_3$), and the second non-magnetic layer is formed of at least one of Al—Si—O, Ti, W, Cr, Ta, Mo, Au, Pd, Pt, NiCr, NiCu, a silicon oxide, a Ti oxide, a W oxide, a Cr oxide, and a Ta oxide.

8. The perpendicular magnetic recording head according to claim 4, wherein the first non-magnetic layer is formed of at least one of $SiO_2$ and Al—Si—O, and the second non-magnetic layer is formed of at least one of W, $WO_3$, Cr, CrOX, and Mo.

9. A perpendicular magnetic recording head comprising:

an auxiliary magnetic pole layer;

a main magnetic pole layer facing thereto provided at a side of a facing surface facing a recording medium, the main magnetic pole layer being composed of a front portion having a small thickness provided at the facing surface side and a rear portion having a large thickness provided at a rear side apart from the facing surface in a height direction, the main magnetic pole layer having a front end surface of the rear portion between a top surface of the front portion and a top surface of the rear portion;

a non-magnetic material layer which is present between the auxiliary magnetic pole layer and the main magnetic pole layer at the facing surface facing the recording medium; and a coil layer provided at the rear side in the height direction for applying a recording magnetic field to the auxiliary magnetic pole layer and the main magnetic pole layer, wherein data is recorded on the recording medium by a perpendicular magnetic field generated from the main magnetic pole layer, wherein the auxiliary magnetic pole layer includes a base portion that has a larger thickness and a greater width in track width direction than the front portion of the main magnetic pole layer at the facing surface, and further includes a convex portion at the facing surface side, the convex portion extending in the direction from the base portion to the main magnetic pole layer, the width of the convex portion in track width direction being smaller than the width of the base portion but greater than the width of the main magnetic pole layer, wherein a bottom surface of the convex portion of the auxiliary magnetic pole layer is located at a position lower than that of a top surface of the rear portion of the main magnetic pole layer, and wherein a rear end surface that reaches to a bottom surface of the convex portion is, at a rear side apart from the facing surface in a height direction, provided at a position closer to the facing surface than the front end surface of the rear portion of the main magnetic pole layer.

10. The perpendicular magnetic recording head according to claim 9, further comprising a second non-magnetic layer provided between the main magnetic pole layer and the first non-magnetic layer, wherein a top surface of the second non-magnetic layer is located at a position lower than that of a top surface of the first non-magnetic layer.

11. The perpendicular magnetic recording head according to claim 10, wherein, when the first non-magnetic layer and the second non-magnetic layer are etched under the same condition, an etching rate of the second non-magnetic layer is higher than an etching rate of the first non-magnetic layer.

12. The perpendicular magnetic recording head according to claim 10, wherein, when the first non-magnetic layer, the second non-magnetic layer, and the main magnetic pole layer are etched under the same condition, etching rates of the second non-magnetic layer and the main magnetic pole layer are higher than an etching rate of the first non-magnetic layer.

13. The perpendicular magnetic recording head according to claim 10, wherein the first non-magnetic layer is formed of alumina ($Al_2O_3$), and the second non-magnetic layer is formed of at least one of Al—Si—O, Ti, W, Cr, Ta, Mo, Au, Pd, Pt, NiCr, NiCu, a silicon oxide, a Ti oxide, a W oxide, a Cr oxide, and a Ta oxide.

14. The perpendicular magnetic recording head according to claim 10, wherein the first non-magnetic layer is formed of at least one of $SiO_2$ and Al—Si—O, and the second non-magnetic layer is formed of at least one of W, $WO_3$, Cr, CrOX, and Mo.

* * * * *